United States Patent
Kubota

(10) Patent No.: US 10,289,576 B2
(45) Date of Patent: May 14, 2019

(54) STORAGE SYSTEM, STORAGE APPARATUS, AND COMMUNICATION METHOD

(71) Applicant: FUJITSU LIMITED, Kawasaki-shi, Kanagawa (JP)

(72) Inventor: Satoshi Kubota, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 239 days.

(21) Appl. No.: 15/239,974

(22) Filed: Aug. 18, 2016

(65) Prior Publication Data

US 2017/0068625 A1 Mar. 9, 2017

(30) Foreign Application Priority Data

Sep. 8, 2015 (JP) .................................. 2015-176484

(51) Int. Cl.
| | |
|---|---|
| *G06F 13/00* | (2006.01) |
| *G06F 12/00* | (2006.01) |
| *G06F 13/16* | (2006.01) |
| *G06F 3/06* | (2006.01) |
| *G06F 13/40* | (2006.01) |

(52) U.S. Cl.
CPC .......... *G06F 13/1668* (2013.01); *G06F 3/061* (2013.01); *G06F 3/067* (2013.01); *G06F 3/0659* (2013.01); *G06F 13/4068* (2013.01)

(58) Field of Classification Search
None
See application file for complete search history.

(56) References Cited

U.S. PATENT DOCUMENTS

| | | | | |
|---|---|---|---|---|
| 5,812,754 A | * | 9/1998 | Lui ..................... | G06F 11/2089 714/6.21 |
| 5,996,014 A | | 11/1999 | Uchihori et al. | |
| 2001/0011357 A1 | | 8/2001 | Mori | |

(Continued)

FOREIGN PATENT DOCUMENTS

| | | |
|---|---|---|
| JP | 10-134485 | 5/1998 |
| JP | 2001-216206 | 8/2001 |
| JP | 2009-282823 | 12/2009 |

OTHER PUBLICATIONS

Japanese Office Action dated Mar. 12, 2019 from Japanese Patent Application No. 2015-176484, 7 pages.

*Primary Examiner* — Hyun Nam
(74) *Attorney, Agent, or Firm* — Staas & Halsey LLP

(57) ABSTRACT

A storage system includes storage apparatuses and a second transmission path. The storage apparatuses each include a control device, and memory devices coupled in series with the control device through a first transmission path having the control device at a beginning. The memory devices are accessed by the control device. The second transmission path couples the storage apparatuses in a loop to allow communications between the control devices. The second transmission path includes the first transmission paths included in the respective storage apparatuses. The second transmission path is formed such that an ending of the first transmission path included in a first storage apparatus of the storage apparatuses is connected to the beginning of the first transmission path included in a second storage apparatus subsequent to the first storage apparatus on the second transmission path.

13 Claims, 26 Drawing Sheets

(56) References Cited

U.S. PATENT DOCUMENTS

| | | | |
|---|---|---|---|
| 2002/0010834 A1* | 1/2002 | Ogawa | G06F 3/0601 711/114 |
| 2007/0094529 A1* | 4/2007 | Lango | G06F 9/5066 714/4.1 |
| 2007/0103984 A1* | 5/2007 | Kavuri | G06F 3/0605 365/185.17 |
| 2009/0290249 A1 | 11/2009 | Makino et al. | |

* cited by examiner

FIG. 9

| VOLUME NUMBER | NUMBER OF DISKS | RAID TYPE | DEVICE NUMBER | | | |
|---|---|---|---|---|---|---|
| LU#0 | 3 | RAID-5 | CE#0 -DE#0 -Slot#0 | CE#0 -DE#1 -Slot#0 | CE#0 -DE#2 -Slot#0 | |
| LU#1 | 4 | RAID-5 | CE#1 -DE#0 -Slot#0 | CE#1 -DE#1 -Slot#0 | CE#2 -DE#0 -Slot#0 | CE#2 -DE#1 -Slot#0 |
| LU#2 | 4 | RAID-10 | CE#0 -DE#0 -Slot#1 | CE#0 -DE#1 -Slot#1 | CE#0 -DE#0 -Slot#2 | CE#0 -DE#1 -Slot#2 |
| ... | ... | ... | ... | | | |

FIG. 11

| ID | SAS DEVICE |
|---|---|
| 0 | CE#0 DA-L |
| 1 | HDD |
| 2 | HDD |
| 3 | HDD |
| ... | ... |
| 48 | HDD |
| 127 | CE#1 DA-O |

FIG. 13A

| BYTE | DATA CONTENT |
|---|---|
| 0 | OPERATION CODE (88h OR 8Ah) |
| 1 | ... |
| 2 ... 9 | LBA |
| 10 ... 13 | DATA LENGTH |
| 14 15 | ... |

FIG. 13B

| BYTE | DATA CONTENT |
|---|---|
| 0 | OPERATION CODE (C7h) |
| 1 2 | CE NUMBER |
| 3 4 | DEVICE NUMBER |
| 5 | COMMAND AREA LENGTH |
| 6 ... n | COMMAND AREA (OPERATION CODE, LBA, DATA LENGTH) |

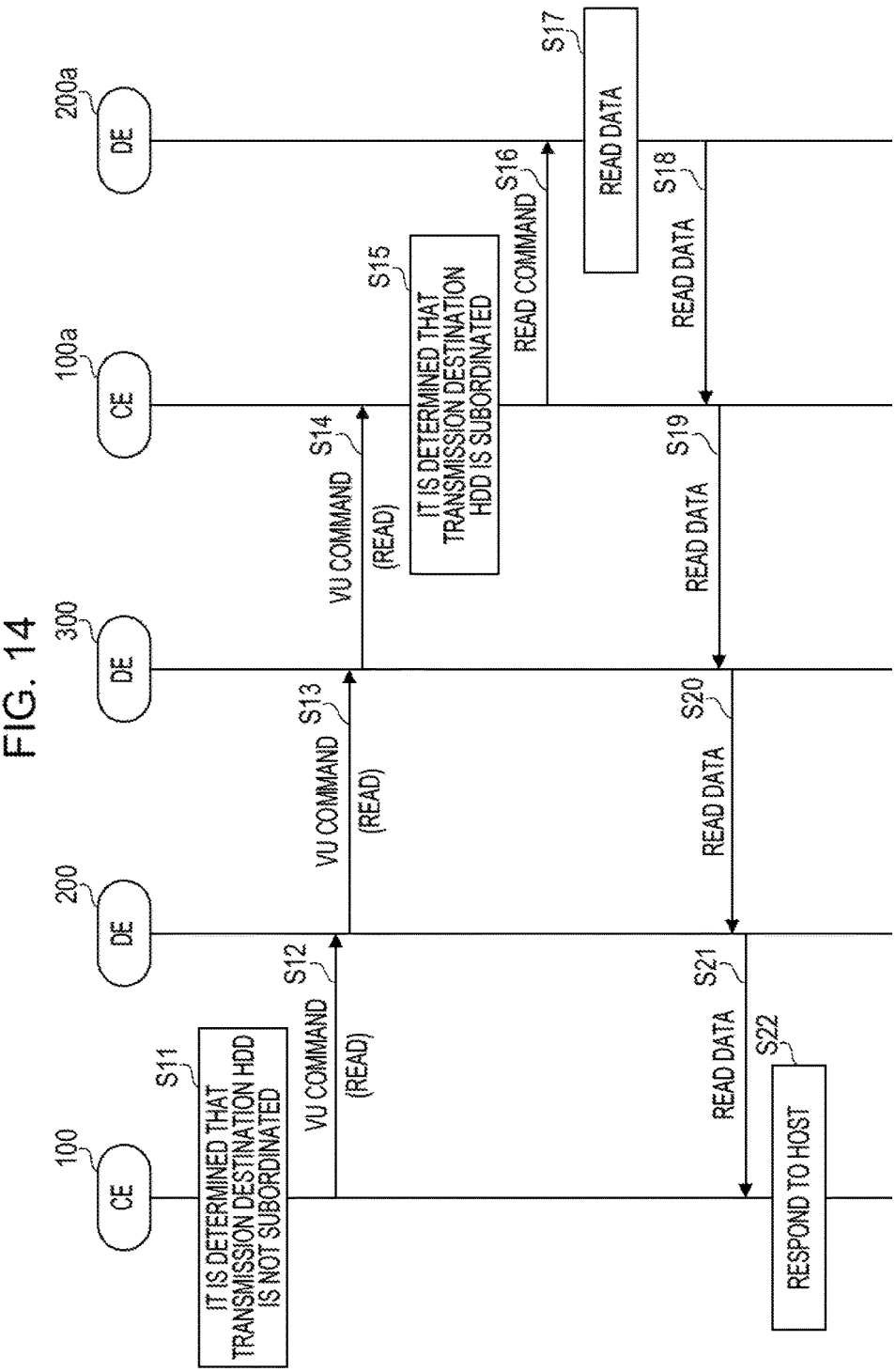

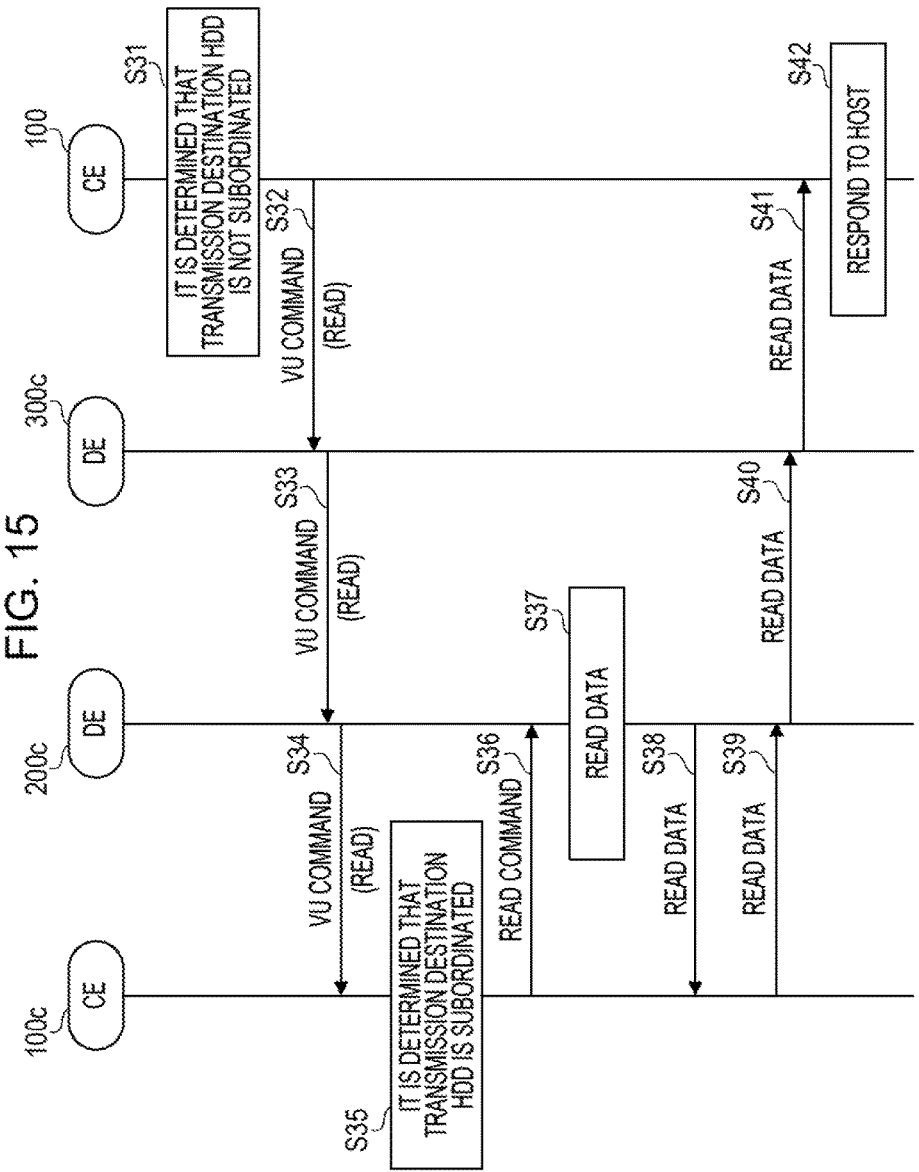

FIG. 17

| CE NUMBER | DA-L | DA-O |
|---|---|---|
| CE#1 | 1 | 4 |
| CE#2 | 2 | 3 |
| CE#3 | 3 | 2 |
| CE#4 | 4 | 1 |

RELATED ART

RELATED ART

STORAGE SYSTEM, STORAGE APPARATUS, AND COMMUNICATION METHOD

CROSS-REFERENCE TO RELATED APPLICATION

This application is based upon and claims the benefit of priority of the prior Japanese Patent Application No. 2015-176484, filed on Sep. 8, 2015, the entire contents of which are incorporated herein by reference.

FIELD

The embodiments discussed herein are related to a storage system, a storage apparatus, and a communication method.

BACKGROUND

In general, a storage system includes a memory device such as a disk array, and a control device that accesses the memory device in accordance with a request from a host apparatus. In recent years, there has been a demand for a highly extensible storage system that allows additional memory devices and/or control devices to be installed as appropriate after the storage system is initially introduced. Such a storage system allows a customer to save initial investment and to enhance access performance and storage capacity with small investment as the business expands.

As an example of a storage system, a shared storage distributed multimedia server system has been proposed as follows. The system includes element servers, a shared disk array including disk devices that store contents, and a shared channel network with which the element servers and the shared disk array are coupled and which enables a multi-initiator configuration. In response to a request from a client, each element server reads the content stored in the shared disk array and outputs the content to an information distribution network.

As an example of a disk array, the following disk array utilizing a loop-form interface has been proposed. The disk array has a configuration in which hard disk drives (HDDs) are coupled via individual port bypass circuits with a loop-form channel coupled by using Fibre Channel (FC) ports.

Related techniques are disclosed in, for example, Japanese Laid-open Patent Publication No. 10-134485 and Japanese Laid-open Patent Publication No. 2001-216206.

As an example of a storage system, a scale-out storage system is known in which additional installation may be made on a storage apparatus basis, where each storage apparatus includes a control device and one or more memory devices. In such a storage system, the storage capacity of the entire system is increased and access performance is improved by causing the control devices to access the memory devices in a distributed manner.

In addition, various processing may be performed through communications between the control devices of storage apparatuses. For instance, data may be transferred between the storage apparatuses so that the capacity and the access frequency may be balanced between the storage apparatuses. Data in a storage apparatus may be copied to another storage apparatus so that data redundancy may be increased. In addition, for one logical volume, physical storage areas controlled by a redundant array of inexpensive disks (RAID) may be distributed and assigned to a plurality of storage apparatuses. In this case, the availability against failures is improved not only on a memory device basis, but also on a storage apparatus basis.

As a method of allowing communication between control devices as described above, a method may be adopted in which the control devices are coupled with each other, for instance, via a relay apparatus. However, with this method, the communication load in the relay apparatus increases as the system size is increased due to additional installation of storage apparatuses. Therefore, there is a problem in that an expensive relay apparatus having high communication performance is desired in order to achieve a large-scale storage system. Alternatively, a method may be adopted in which the control devices are coupled with each other over a network. However, even with this method, the network traffic increases as the system size is increased, and thus a network with a high bandwidth has to be used.

SUMMARY

According to an aspect of the present invention, provided is a storage system including storage apparatuses and a second transmission path. The storage apparatuses each include a control device, and memory devices coupled in series with the control device through a first transmission path having the control device at a beginning. The memory devices are accessed by the control device. The second transmission path couples the storage apparatuses in a loop to allow communications between the control devices. The second transmission path includes the first transmission paths included in the respective storage apparatuses. The second transmission path is formed such that an ending of the first transmission path included in a first storage apparatus of the storage apparatuses is connected to the beginning of the first transmission path included in a second storage apparatus subsequent to the first storage apparatus on the second transmission path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating an exemplary volume management table;

FIG. 11 is a diagram illustrating an exemplary SAS map;

FIGS. 13A and 13B are each a diagram illustrating an exemplary command utilized in a second embodiment;

FIG. 14 is a sequence diagram illustrating exemplary processing when an HDD in another storage apparatus is accessed from a CE;

FIG. 15 is a sequence diagram illustrating another exemplary processing when an HDD in another storage apparatus is accessed from a CE;

FIG. 17 is a diagram illustrating an exemplary hop number table;

DESCRIPTION OF EMBODIMENTS

Hereinafter, embodiments of the present disclosure will be described with reference to the drawings.

First Embodiment

Figure 1:
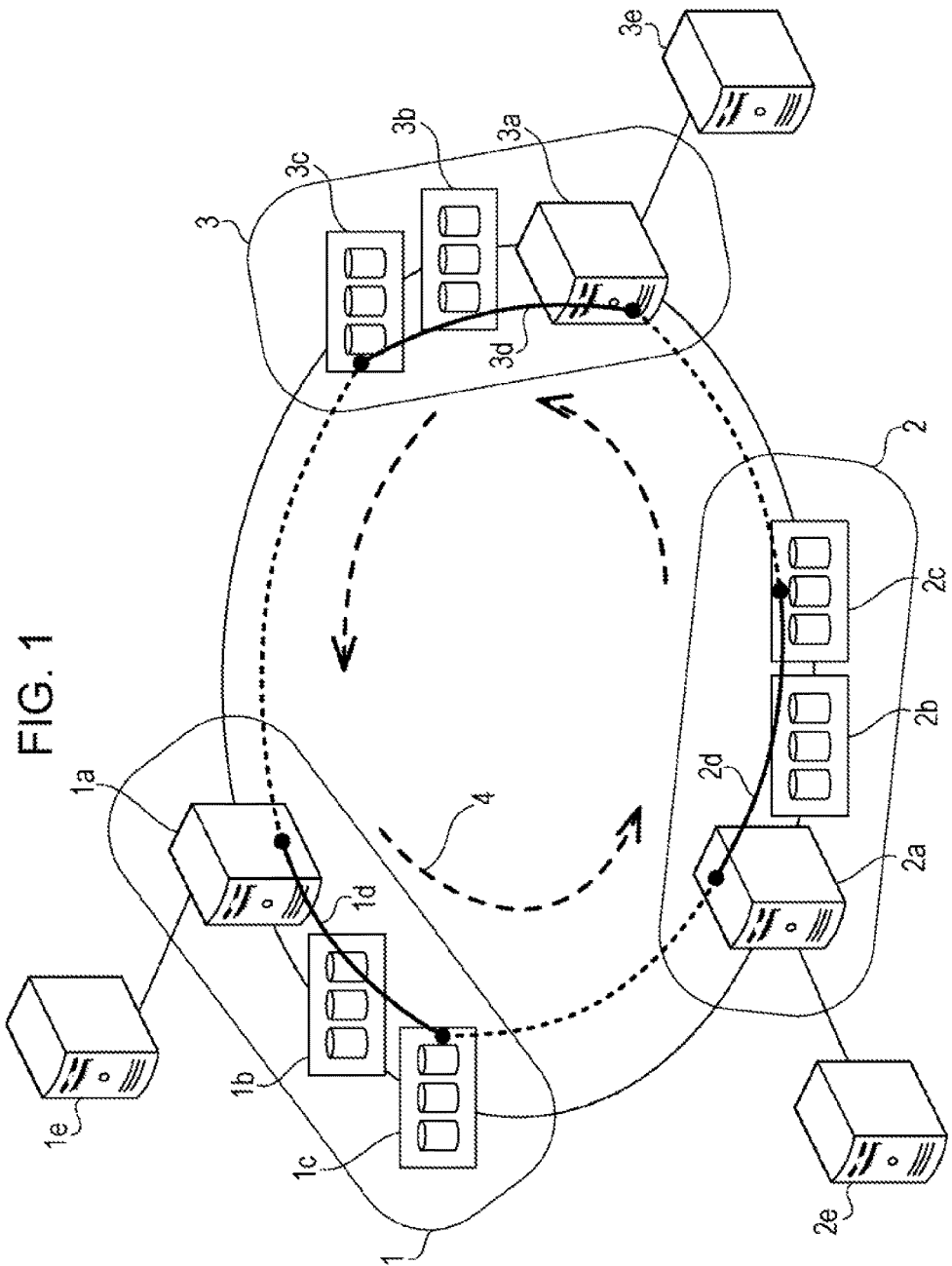
FIG. 1 is an illustration depicting an exemplary configuration of a storage system according to a first embodiment.

FIG. 1 is an illustration depicting an exemplary configuration of a storage system according to a first embodiment. The storage system illustrated in FIG. 1 has a configuration in which storage apparatuses 1, 2, 3 are coupled in a loop. It is to be noted that the number of storage apparatuses coupled in a loop may be two or greater than three.

Each of the storage apparatuses has one control device and one or more memory devices. In the example of FIG. 1, each of the storage apparatuses 1, 2, 3 includes two sets of memory devices. Each storage apparatus includes a local transmission path (first transmission path) having the control device at a beginning, and one or more memory devices are coupled in series with the control device through the local transmission path.

In other words, in FIG. 1, the storage apparatus 1 includes a control device 1a and memory devices 1b, 1c which are coupled in series with the control device 1a through a local transmission path 1d having the control device 1a at a beginning. The storage apparatus 2 includes a control device 2a and memory devices 2b, 2c which are coupled in series with the control device 2a through a local transmission path 2d having the control device 2a at a beginning. The storage apparatus 3 includes a control device 3a and memory devices 3b, 3c which are coupled in series with the control device 3a through a local transmission path 3d having the control device 3a at a beginning.

In FIG. 1, as an example, host apparatuses 1e, 2e, 3e are coupled with the control devices 1a, 2a, 3a, respectively. The control device 1a is able to access the memory devices at least in response to a request from the host apparatus 1e. Similarly, the control device 2a is able to access the memory devices at least in response to a request from the host apparatus 2e, and the control device 3a is able to access the memory devices at least in response to a request from the host apparatus 3e.

The storage apparatuses 1, 2, 3 are coupled in a loop through a loop-form transmission path 4 (second transmission path) including the local transmission paths 1d, 2d, 3d. The loop-form transmission path 4 allows the control devices 1a, 2a, 3a to perform communication therebetween.

The local transmission paths 1d, 2d, 3d are coupled in a loop, thereby forming the loop-form transmission path 4. More specifically, an ending of the local transmission path 1d is connected to the beginning of the local transmission path 2d, an ending of the local transmission path 2d is connected to the beginning of the local transmission path 3d, and the ending of the local transmission path 3d is connected to an beginning of the local transmission path 1d, thereby forming the loop-form transmission path 4.

It is to be noted that "the local transmission paths 1d, 2d, 3d are coupled in a loop" does not strictly mean that communication cables corresponding to the transmission paths are physically coupled via a wire. For instance, data transmitted through the local transmission path 1d may be transmitted to the local transmission path 2d by internal processing of the control device 2a, or data may be transmitted in the reverse direction. Similarly, data transmitted through the local transmission path 2d may be transmitted to the local transmission path 3d by internal processing of the control device 3a, or data may be transmitted in the reverse direction. Also, data transmitted through the local transmission path 3d may be transmitted to the local transmission path 1d by internal processing of the control device 1a, or data may be transmitted in the reverse direction.

In the storage system, a storage apparatus may be additionally installed, for instance. In this case, the local transmission path in a new storage apparatus is inserted between existing local transmission paths in the loop-form transmission path 4. For instance, the local transmission path in the new storage apparatus is inserted in series between the local transmission path 3d of the storage apparatus 3 and the local transmission path 1d of the storage apparatus 1. In this manner, additional installation is made on storage apparatus-by-storage apparatus basis, and thus access performance to a memory device in the storage system may be reinforced and the storage capacity may be expanded.

The control devices 1a, 2a, 3a are able to communicate with one another through the loop-form transmission path 4. For instance, the control device 1a is able to access a drive enclosure (DE) in the storage apparatus 2 via the control device 2a in the storage apparatus 2. Thus, for instance, data recorded in the DE in the storage apparatus 1 may be copied or moved to the DE in the storage apparatus 2. Therefore, it is possible to balance the storage capacity and the access frequency or to increase the redundancy of data in the system.

In addition, for instance, the control device 1a may allocate an HDD of the DE in the storage apparatus 2 as a physical memory device for a logical volume to be accessed from the host apparatus 1e. Thus, the degree of flexibility in data placement improves. Memory devices in different storage apparatuses may be allocated as physical storage areas to one logical volume, and writing to those memory devices may be controlled by RAID. In this case, even in the event of a failure of a storage apparatus, the possibility of continuous successful reading and writing of data in the logical volume increases, and thus a high availability is achieved for the storage system.

As a method of allowing communication between control devices like this, a method may be adopted in which the control devices are coupled with each other, for instance, via a relay apparatus. However, with this method, the larger the number of storage apparatuses in the system, the higher the communication load in the relay apparatus. Therefore, there is a problem in that an expensive relay apparatus having high communication performance is desired in order to achieve a large-scale storage system. Alternatively, a method may be adopted in which the control devices are coupled with each other over a network. However, even with this method, the larger the number of storage apparatuses, the traffic in the network increases, and thus a high bandwidth network is desired.

In contrast to this, in the storage system of the present embodiment, the control devices of different storage apparatuses are coupled by the loop-form transmission path 4 which is formed by using the local transmission paths 1d, 2d, 3d included in the storage apparatuses. By adopting a simple configuration in which the local transmission paths are coupled without using a dedicated relay apparatus to make connection between the control devices, the cost for system implementation is reduced.

Also, since the communication processing load for accessing a memory device from a control device is distributed over the apparatuses in the system, even in the case where a large number of storage apparatuses are provided, it is less probable that the communication load is concentrated on a specific apparatus. Therefore, an apparatus having high communication performance does not have to be selected as the constituent apparatus in the system.

Thus, according to the first embodiment, it is possible to simplify the implementation of network connection associated with the expansion of the storage system.

Second Embodiment

Next, a storage system according to a second embodiment will be described.

Figure 2:
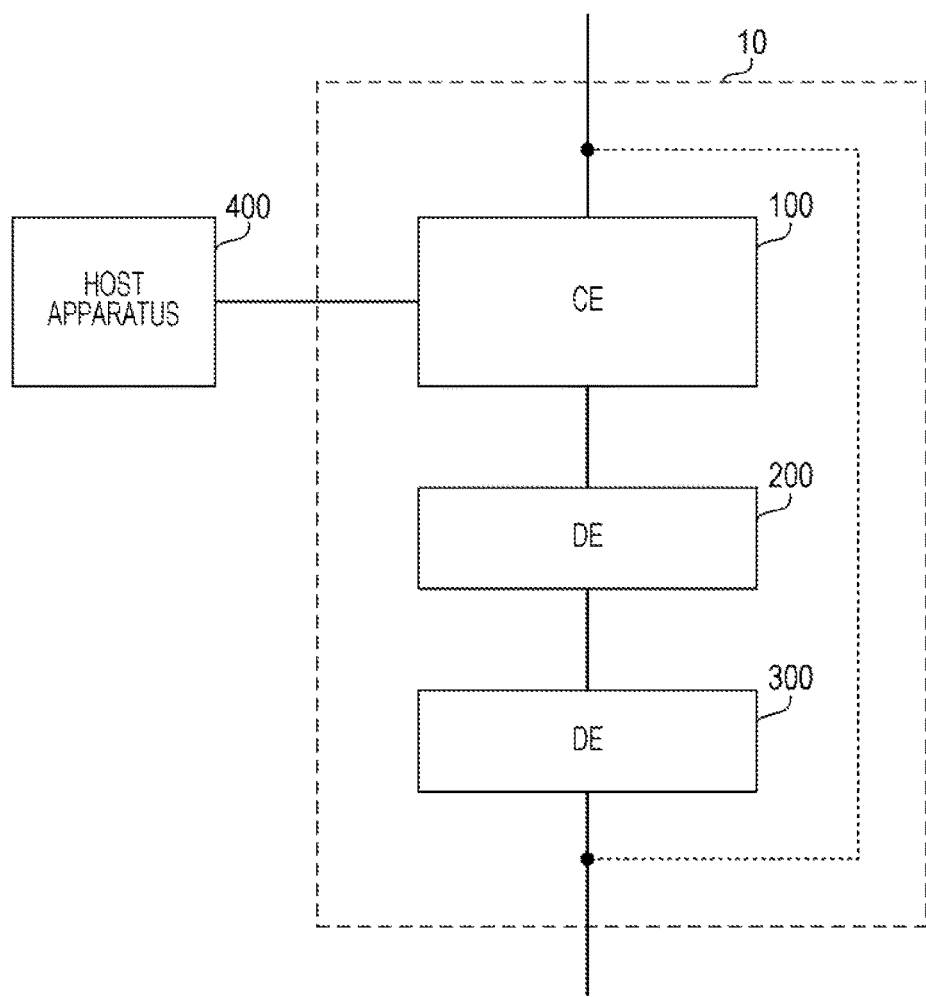
FIG. 2 is a diagram illustrating an exemplary configuration of a storage apparatus included in a storage system.

FIG. 2 is a diagram illustrating an exemplary configuration of a storage apparatus included in a storage system. The storage system according to the second embodiment includes at least one storage apparatus 10 illustrated in FIG. 2. The storage apparatus 10 is the unit of additional installation in the storage system, and the storage system is extendable by additionally installing a new storage apparatus 10 to the storage system.

The storage apparatus 10 includes one controller enclosure (CE) 100 and at least one drive enclosure (DE). Hereinafter, description is given under the assumption that the storage apparatus 10 includes two DEs 200, 300 as illustrated in FIG. 2.

The CE 100 is coupled with a host apparatus 400. The CE 100 controls access to a memory device mounted in a DE in the storage system in accordance with an access request from the host apparatus 400. A memory device to be accessed from the host apparatus 400 may be a memory device in DEs 200, 300 mounted in the same storage apparatus 10 including the CE 100 that communicates with the host apparatus 400, or may be a memory device in DEs 200, 300 mounted in another storage apparatus 10.

In the DEs 200, 300, two or more memory devices are mounted that may be accessed from the host apparatus 400. Each memory device is, for instance, an HDD, and in this case, the DEs 200, 300 are also called a disk array apparatuses. The memory device may be another type of a nonvolatile memory device such as a solid state drive (SSD).

When multiple DEs are mounted on the storage apparatus 10, the multiple DEs are coupled in series with the CE at the head. In the example of FIG. 2, the CE 100 is coupled with the DE 200 which is coupled with the DE 300. In this configuration, the CE 100 basically accesses a memory device in the DE 300 via the DE 200.

When the storage system includes multiple storage apparatuses 10, the CE 100 is coupled with a DE in a preceding storage apparatus 10, and the terminal DE (DE 300 in FIG. 2) in the storage apparatus 10 is coupled with a CE 100 in a subsequent storage apparatus 10. The transmission path from the CE 100 to the preceding storage apparatus 10 is ultimately coupled with the transmission path from the DE 300 to the subsequent storage apparatus 10, thereby forming a loop-form transmission path. On the other hand, when the storage system includes one storage apparatus 10, as indicated by a dotted line in FIG. 2, the DE 300 is coupled with the CE 100, thereby forming a loop-form transmission path in the storage apparatus 10. Formation patterns of such a transmission path will be described in detail later.

Figure 3:
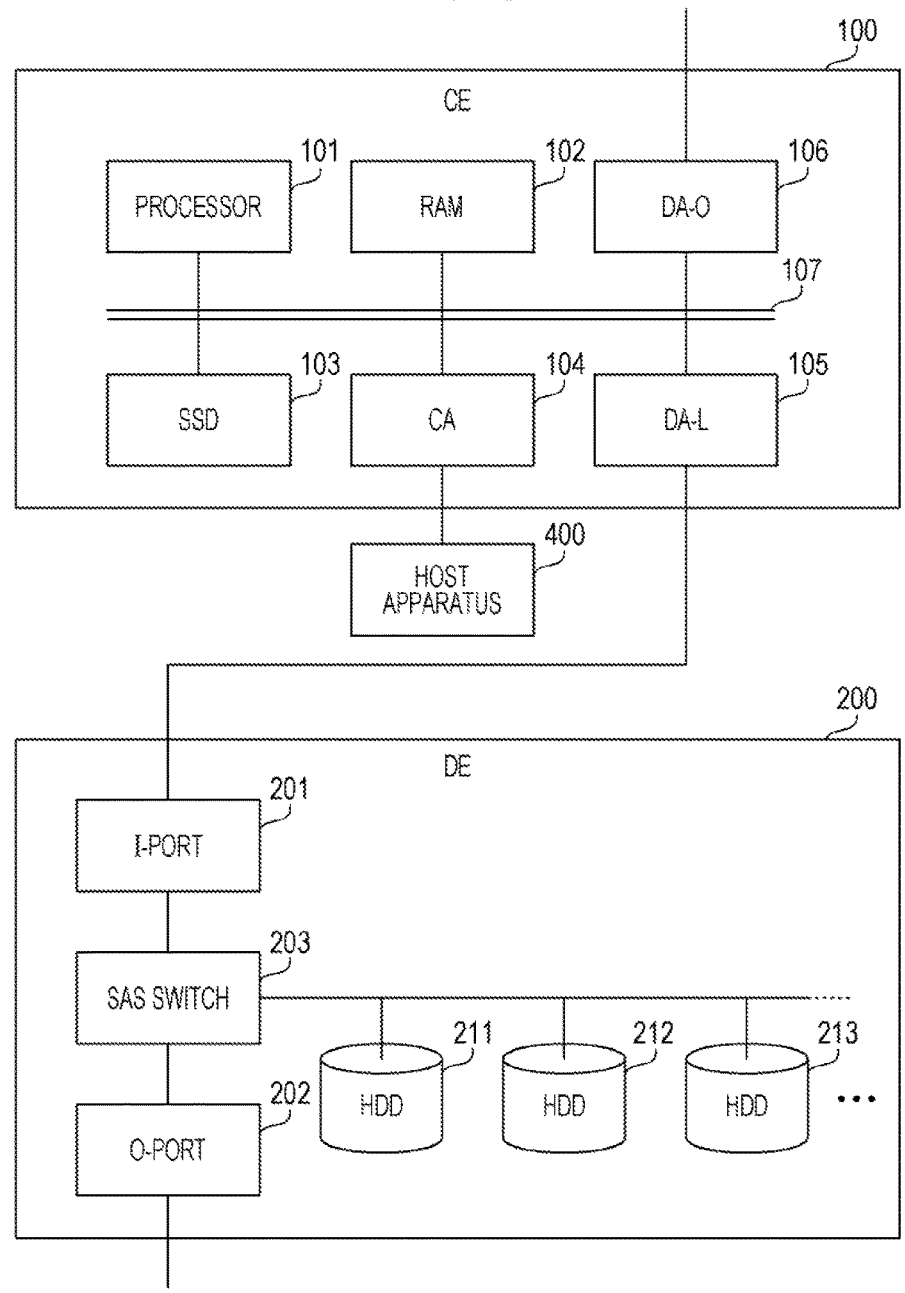
FIG. 3 is a diagram illustrating an exemplary hardware configuration of each of a CE and a DE.

FIG. 3 is a diagram illustrating an exemplary hardware configuration of each of a CE and a DE.

The entire apparatus of the CE 100 is controlled by a processor 101. The processor 101 is, for instance, a central processing unit (CPU), a micro processing unit (MPU), a digital signal processor (DSP), an application specific integrated circuit (ASIC), or a programmable logic device (PLD). The processor 101 may be a multiprocessor. The processor 101 may be a combination of two or more elements of a CPU, an MPU, a DSP, an ASIC, and a PLD.

The processor 101 is coupled with a random access memory (RAM) 102 and multiple peripherals via a bus 107.

The RAM 102 is used as the main memory unit of the CE 100. The RAM 102 temporarily stores therein at least part of an operating system (OS) program and application programs to be executed by the processor 101. In addition, the RAM 102 stores therein various pieces of data used for processing by the processor 101.

As the peripherals, an SSD 103, a channel adapter (CA) 104, a device adapter-local (DA-L) 105, and a DA-Out (DA-O) 106 are coupled with the bus 107.

The SSD 103 is used as an auxiliary storage of the CE 100. The SSD 103 stores therein an OS program, application programs, and various pieces of data. It is to be noted that another type of a nonvolatile memory device such as an HDD may also be used as the auxiliary storage.

The CA 104 is an interface for communicating with the host apparatus 400.

The DA-L 105 is an interface for communicating with a DE in the same storage apparatus 10. On the other hand, the DA-O 106 is an interface for communicating with the terminal DE in the same storage apparatus 10 or the terminal DE in another storage apparatus 10. The DA-L 105 and the DA-O 106 constitute part of the loop-form transmission path formed in the storage system.

In the present embodiment, as an example, the DA-L 105 and the DA-O 106 are interfaces for performing communication in accordance with serial attached small computer system interface (SAS) standard. The DA-L 105 and the DA-O 106 are each operative as a SAS initiator (a master that is able to designate data transfer to transmit data), and are also operative as a SAS target (a slave that is able to receive the designated data transfer).

It is to be noted that the CE 100 may be equipped with multiple sets of the storage controller including the above-mentioned processor 101, the RAM 102, the SSD 103, the CA 104, the DA-L 105, and the DA-O 106.

The DE 200 includes an in-port (I-port) 201, an out-port (O-port) 202, a SAS switch 203, and HDDs 211, 212, 213, etc.

The I-port 201 is a communication port coupled with the CE 100 in the same storage apparatus 10. On the other hand, the O-port 202 is a communication port coupled with the subsequent DE in the same storage apparatus 10 or coupled with a CE in another storage apparatus 10.

The SAS switch 203 controls data transmission and reception between the I-port 201, the O-port 202, and the HDDs 211, 212, 213, etc. It is to be noted that the SAS switch 203 is mounted as a SAS expander, for instance.

The HDDs 211, 212, 213, etc. are each memory devices to be accessed from the host apparatus. More specifically, the HDDs 211, 212, 213, etc. may form part of the physical storage areas of a logical volume to be accessed from the host apparatus.

Although the DE 200 has been illustrated in FIG. 3, the DE 300 has the same hardware configuration as that of the DE 200. However, an interface corresponding to the I-port 201 in the DE 300 is coupled with the preceding DE in the same storage apparatus 10.

Next, examples of connection of the storage apparatuses 10 and will be described.

Figure 4:
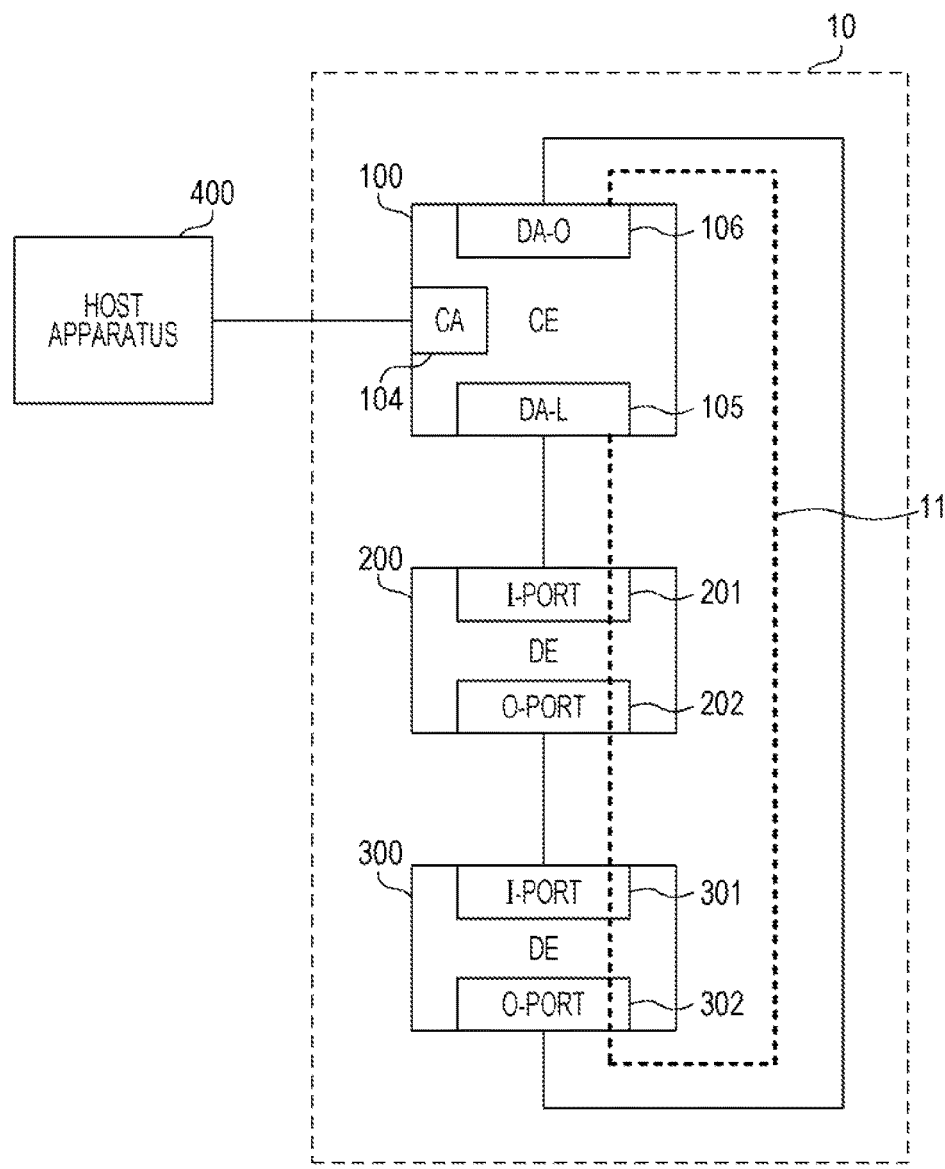
FIG. 4 is a diagram illustrating an exemplary configuration of a storage system including one storage apparatus.

FIG. 4 is a diagram illustrating an exemplary configuration of a storage system including one storage apparatus. In the storage apparatus 10, the DA-L 105 of the CE 100 is coupled with the I-port 201 of the DE 200, and the O-port 202 of the DE 200 is coupled with an I-port 301 of the DE 300. Thus, the CE 100, the DE 200, and the DE 300 are coupled in series. In addition, the host apparatus 400 is coupled with the CA 104 of the CE 100. The connection relationship mentioned above is the same regardless of the number of storage apparatuses included in the storage system.

When only one storage apparatus 10 is included in the storage system, an O-port 302 of the terminal DE 300 is coupled with the DA-O 106 of the CE 100. Thus, a loop-form communication path is formed that passes through the DA-L 105, the I-port 201, the O-port 202, the I-port 301, the O-port 302, and the DA-O 106. The loop-form communication path is utilized for access from the CE 100 to an HDD in the DEs 200, 300.

In the configuration of FIG. 4, the loop-form communication path is formed by the local transmission path 11 from the DA-L 105 of the CE 100 to the DA-O 106 of the CE 100 illustrated by a broken line in FIG. 4. The local transmission path 11 is a transmission path that includes at least one set of a SAS initiator and one or more SAS targets.

The CE 100 is able to perform communication in both directions along the loop-form communication path. This is achieved by the storage system that supports the multi-initiator function of the SAS. When the DA-L 105 of the CE 100 operates as the SAS initiator of the local transmission path 11, the CE 100 transmits a command in the counter-clockwise direction along the loop-form communication path in FIG. 4. Also, when the DA-O 106 of the CE 100 operates as the SAS initiator of the local transmission path 11, the CE 100 transmits a command in the clockwise direction along the loop-form communication path in FIG. 4.

Figure 5:
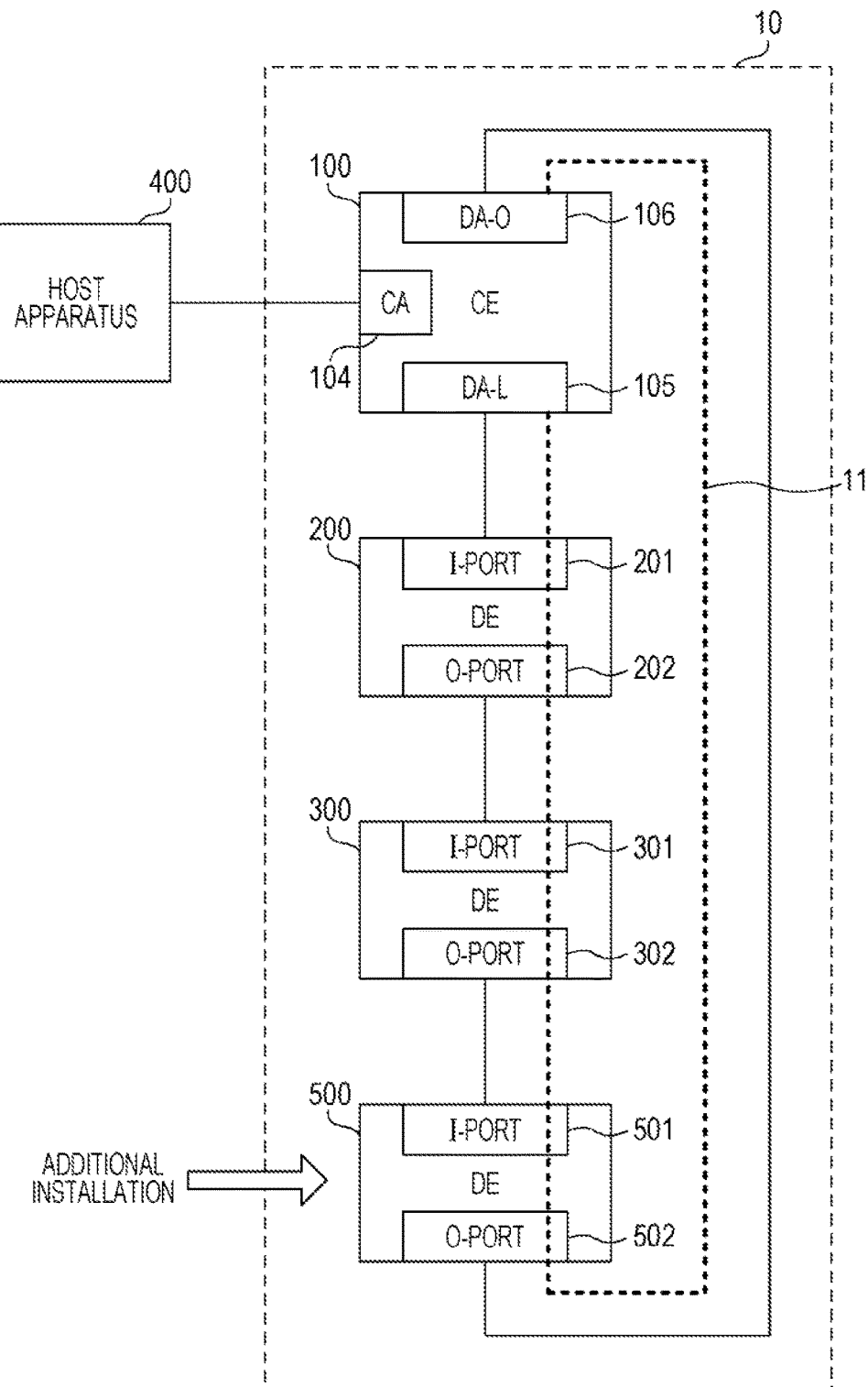
FIG. 5 is a diagram illustrating exemplary additional installation of a DE.

FIG. 5 is a diagram illustrating exemplary additional installation of a DE. As an example, FIG. 5 illustrates the case where a new DE 500 is additionally installed in the storage apparatus 10 in the storage system in the configuration illustrated in FIG. 4.

When a new DE 500 additionally installed in the storage apparatus 10, the new DE 500 is coupled in series with the terminal DE 300 in the storage apparatus 10. In this process, an I-port 501 of the DE 500 is coupled with the O-port 302 of the DE 300. Also, an O-port 502 of the DE 500 is coupled with the DA-O 106 of the CE 100.

When the DE 500 is additionally installed in the state of FIG. 4, the O-port 302 of the DE 300 and the DA-O 106 of the CE 100 are separated, and the DE 500 is coupled between the O-port 302 and the DA-O 106. In other words, a transmission path including the I-port 501 and the O-port 502 of the DE 500 is inserted between the O-port 302 of the DE 300 and the DA-O 106 of the CE 100 in the local transmission path 11.

During such additional installation, the communication path which passes through the DA-L 105, the I-port 201, the O-port 202, and the I-port 301 is maintained, which is part of the above-mentioned loop-form communication path. Thus, additional installation of a new DE 500 may be made without stopping an access operation from the CE 100 to an HDD in the DEs 200, 300.

Figure 6:
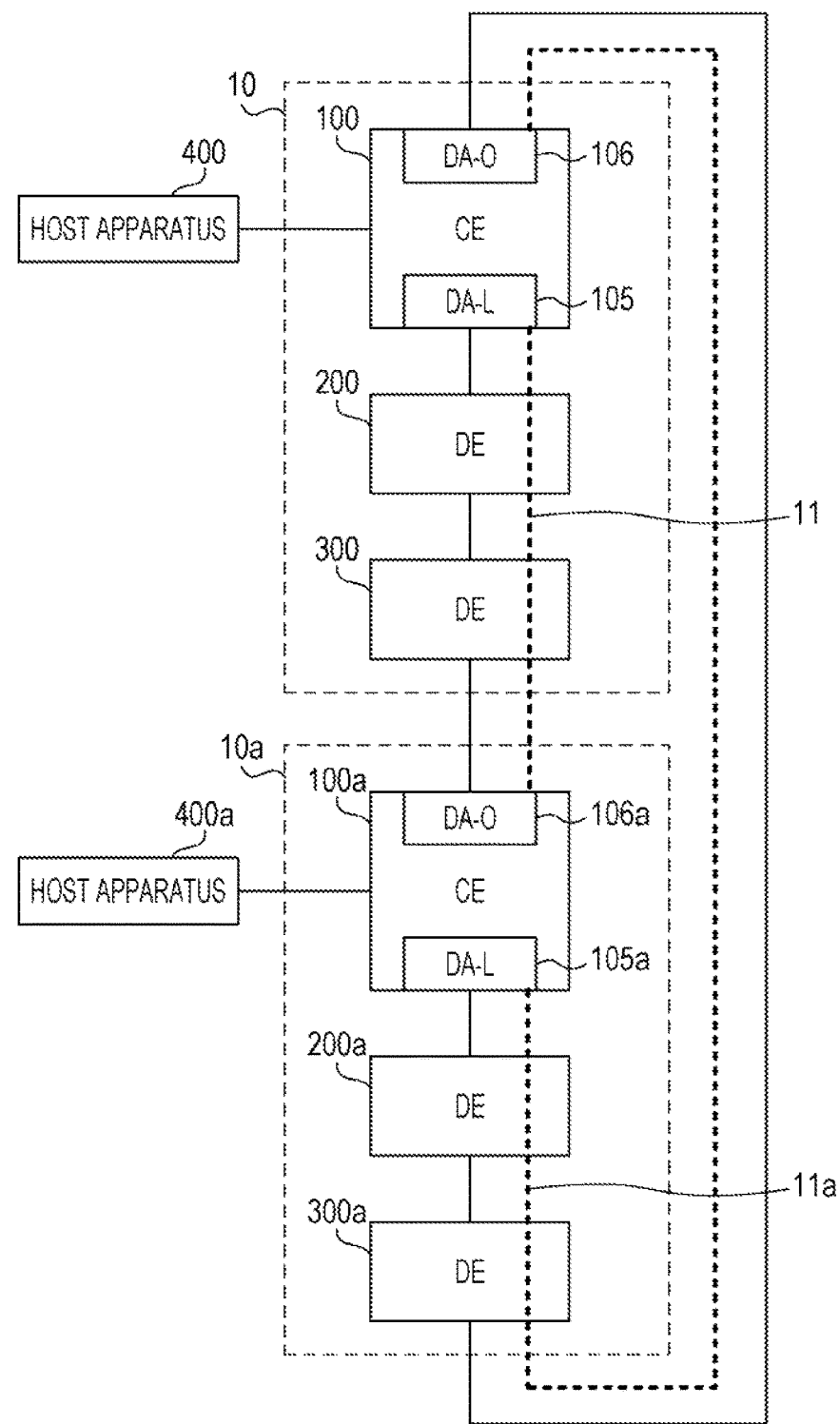
FIG. 6 is a diagram illustrating an exemplary configuration of a storage system including two storage apparatuses.

FIG. 6 is a diagram illustrating an exemplary configuration of a storage system including two storage apparatuses. In FIG. 6, the CE 100a, and the DEs 200a, 300a included in the storage apparatus 10a have the same hardware configuration as the CE 100, and the DEs 200, 300, respectively. In addition, the host apparatus 400a is coupled with the CE 100a. In FIG. 6, illustration of the I-port and the O-port included in the DE is omitted.

When a new storage apparatus 10a is additionally installed in the state of FIG. 4, the O-port of the DE 300 and the DA-O 106 of the CE 100 are separated and the new storage apparatus 10a is inserted between the O-port and the DA-O 106. Specifically, the O-port of the DE 300 is coupled with a DA-O 106a of the CE 100a, and the DA-O 106 of the CE 100 is coupled with an O-port of a DE 300a.

Thus, a loop-form communication path is formed that passes through the DA-L 105 of the CE 100, the I-port of the DE 200, the O-port of the DE 200, the I-port of the DE 300, the O-port of the DE 300, the DA-O 106a of the CE 100a, a DA-L 105a of the CE 100a, an I-port of a DE 200a, an O-port of the DE 200a, an I-port of the DE 300a, the O-port of the DE 300a, and the DA-O 106 of the CE 100.

The loop-form communication path of FIG. 6 is formed by connecting the local transmission paths 11, 11a in a loop. In additional installation in the state of FIG. 4, it may be stated that a new local transmission path 11a is inserted at one end of the local transmission path 11. Thus, the one end of the local transmission path 11 is changed from the DA-O 106 of the CE 100 to the DA-O 106a of the new CE 100a. The new local transmission path 11a includes the DA-L 105a of the CE 100a, the I-port of the DE 200a, the O-port of the DE 200a, the I-port of the DE 300a, the O-port of the DE 300a, and the DA-O 106 of the CE 100.

Even during the additional installation of the storage apparatus 10a, the communication path passing through the DA-L 105 of the CE 100, the I-port of the DE 200, the O-port of the DE 200, and the I-port of the DE 300 is maintained. Thus, additional installation of the new storage apparatus 10a may be made without stopping an access operation from the CE 100 to an HDD in the DEs 200, 300.

When a new storage apparatus is further additionally installed in the state of FIG. 6, the O-port of the DE 300a and the DA-O 106 of the CE 100 are separated, and the new storage apparatus is inserted between the O-port and the DA-O 106.

Figure 7:
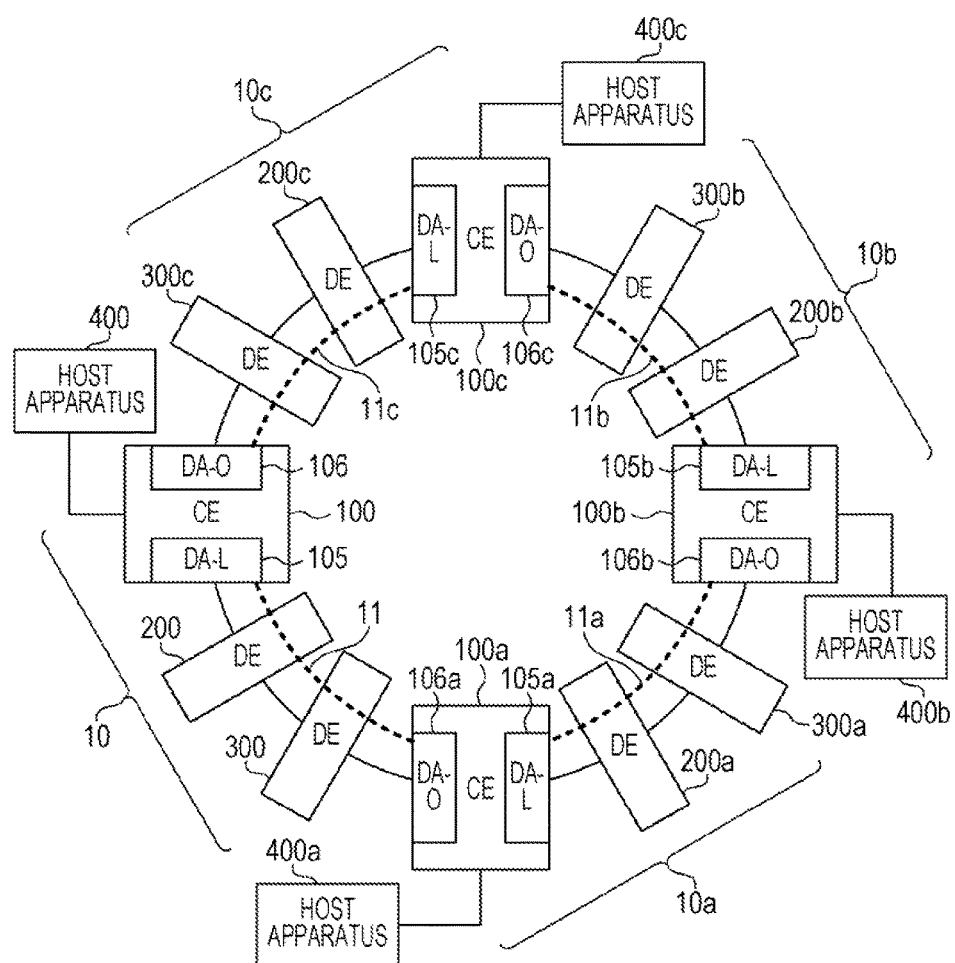
FIG. 7 is a diagram illustrating an exemplary configuration of a storage system including four storage apparatuses.

FIG. 7 is a diagram illustrating an exemplary configuration of a storage system including four storage apparatuses. In FIG. 7, a CE 100b and DEs 200b, 300b included in a storage apparatus 10b have the same hardware configuration as the CE 100 and the DEs 200, 300, respectively, and a CE 100c and DEs 200c, 300c included in a storage apparatus 10c have the same hardware configuration as the CE 100 and the DEs 200, 300, respectively. In addition, a host apparatus 400b is coupled with the CE 100b, and a host apparatus 400c is coupled with the CE 100c. In FIG. 7, similarly to FIG. 6, illustration of the I-port and the O-port included in the DE is omitted.

In the example of FIG. 7, the O-port of the DE 300 located at the end in the storage apparatus 10 is coupled with the DA-O 106a of the CE 100a of the subsequent storage apparatus 10a. The O-port of a DE 300a located at the end of the storage apparatus 10a is coupled with a DA-O 106b of the CE 100b of the subsequent storage apparatus 10b. The O-port of a DE 300b located at the end of the storage apparatus 10b is coupled with a DA-O 106c of the CE 100c of the subsequent storage apparatus 10c. The O-port of a DE 300c located at the end of the storage apparatus 10c is coupled with the DA-O 106 of the CE 100 of the head storage apparatus 10.

Thus, the storage apparatuses 10, 10a, 10b, 10c are coupled in a loop, and a loop-form communication path is formed that passes through the DA-L 105 of the CE 100, the I-port of the DE 200, the O-port of the DE 200, the I-port of the DE 300, the O-port of the DE 300, the DA-O 106a of the CE 100a, the DA-L 105a of the CE 100a, the I-port of the DE 200a, the O-port of the DE 200a, the I-port of the DE 300a, the O-port of the DE 300a, the DA-O 106b of the CE 100b, a DA-L 105b of the CE 100b, an I-port of a DE 200b, an O-port of the DE 200b, an I-port of the DE 300b, the O-port of the DE 300b, the DA-O 106c of the CE 100c, a DA-L 105c of the CE 100c, an I-port of a DE 200c, an O-port of the DE 200c, an I-port of the DE 300c, the O-port of the DE 300c, and the DA-O 106 of the CE 100. The loop-form communication path is formed by connecting the local transmission paths 11, 11a, 11b, 11c in a loop.

As in the above examples of FIGS. 6 and 7, in the storage system according to the present embodiment, it is possible to additionally install a storage apparatus and to extend the storage system by additionally coupling the storage apparatus in a loop. When a new storage apparatus is additionally installed, a communication path passing through the new storage apparatus is inserted in a loop-form communication path formed before the additional installation.

Each CE in the storage system is able to access each HDD in any DE through the loop-form communication path. For instance, in FIG. 7, the CE 100 is able to access not only each HDD in the DEs 200, 300 included in the storage apparatus 10, but also each HDD in any DE (for instance, the DE 200b included in the storage apparatus 10b) included in another storage apparatus. Therefore, in the storage system, physical storage areas for a logical volume defined in a CE may be allocated to any HDDs in any DEs, for instance.

Consequently, the additional installation of storage apparatuses improves the performance of response to an access request from a host apparatus, and also increases the capacity of a storage to be accessed from the host apparatus. Also, additional installation on a storage apparatus-by-storage apparatus basis is allowed, thereby making it possible to increase the performance of response to an access request and the storage capacity stepwise as appropriate, and thus an initial investment for constructing the storage system may be reduced.

In addition, the multi-initiator function is supported, and the DA-L and the DA-O of any CE in the storage system are each operative as a SAS initiator. Thus, each CE is able to access any HDD in another storage apparatus through the loop-form communication path in each of the clockwise direction and the counterclockwise direction. Therefore, even when part of the loop-form communication path is separated for additional installation of a storage apparatus or a DE, each CE is able to continue to communicate with any HDD in the existing DEs. Therefore, a high availability is achieved for the storage system.

Here, a summary of the rules of connection between apparatuses in the storage system according to the present embodiment is as follows:

(1) A DA-L of a CE is coupled with an I-port of a DE in the same storage apparatus.

(2) A DA-O of a CE is coupled with an O-port of a DE in another storage apparatus or in the same storage apparatus.

(3) An I-port of a DE is coupled with a DA-L of a CE in the same storage apparatus or with an O-port of another DE in the same storage apparatus.

(4) An O-port of a DE is coupled with an I-port of another DE in the same storage apparatus or with a DA-O of a CE in another storage apparatus.

(5) When a new storage apparatus is additionally installed, the new storage apparatus is coupled between an O-port of a terminal DE included in the terminal apparatus of existing storage apparatuses and a DA-O of a CE of the head storage apparatus.

(6) When a new DE is additionally installed in a storage apparatus, the new DE is coupled between the O-port of the terminal DE of the storage apparatus and the DA-O of the CE of the subsequent storage apparatus.

Next, an example of table information stored in a CE will be illustrated and the communication processing using the table information will be described in more detail.

Figure 8:
FIG. 8 is a diagram illustrating an exemplary configuration management table.

First, FIG. 8 is a diagram illustrating an exemplary configuration management table. A configuration management table 111 provides a list of CEs, DEs, and HDDs included in the storage system and table information for managing connection relationships between the CEs, DEs, and HDDs. The configuration management table 111 includes items of CE number, DE number, and slot number where an identification number of a CE is registered to the CE number, an identification number of a DE is registered to the DE number, and a number indicating the position of an HDD in a DE is registered to the slot number.

The CE number is registered in association with the respective numbers of one or more DEs mounted in the same storage apparatus. FIG. 8 illustrates an example in which CE#0, DE#0, and DE#1 are mounted in the same storage apparatus. In this case, DE#0 and DE#1 are registered in association with the CE#0. Also, the DE number is registered in association with the numbers indicating the positions of the respective HDDs mounted in the DE.

In the configuration management table 111, the order of the registered CEs indicates the order of connection between the storage apparatuses including the CEs. The example of FIG. 8 indicates that the storage apparatus including CE#0, the storage apparatus including CE#1, the storage apparatus including CE#2, and the storage apparatus including CE#3 are coupled in series in that order. FIG. 8 indicates that the storage apparatus including CE#3 registered at the end is coupled with the storage apparatus including CE#0 registered at the head, thereby coupling the storage apparatuses in a loop. When a new storage apparatus is additionally installed, the number of the CE included in the new storage apparatus is added to the end of the configuration management table 111.

Furthermore, in the configuration management table 111, the registration order of DEs registered in association with a CE number indicates the order of connection between the DEs in a corresponding storage apparatus. The example of FIG. 8 indicates that CE#0, DE#0, and DE#1 are coupled in series in that order in the storage apparatus including CE#0. When a new DE is additionally installed, the number of the new DE is added next to the number of the terminal DE in the same storage apparatus.

The configuration management table 111 as described above is stored commonly in all CEs included in the storage system. When a storage apparatus or a DE is additionally installed in the storage system, the configuration management table 111 in all CEs is updated. Registration and update for each CE of the configuration management table 111 is performed, for instance, by an input operation by an administrator. Alternatively, registration and update of the configuration management table 111 may be automatically performed by detecting additional installation of a storage apparatus or a DE automatically. For instance, as described later, each CE coupled with the storage system has a function of automatically detecting a SAS device included in a device group under control of the CE. Each CE distributes the SAS devices detected by itself along with the connection relationship to other CEs. Each CE constructs the configuration management table 111 on the basis of the information distributed from other CEs.

FIG. 9 is a diagram illustrating an exemplary volume management table. A volume management table 112 provides table information for managing the information related to all logical volumes defined in the storage system. The volume management table 112 includes items of volume number, number of disks, RAID type, and device number.

In the item of volume number, an identification number of a defined logical volume is registered. In the item of number of disks, the number of HDDs, which form physical storage areas for a logical volume, is registered. The item of RAID type indicates the type of RAID for controlling data recording operations to the physical storage areas for the logical volume. In the item of device number, information for identifying HDDs forming the physical storage areas for the logical volume is registered. Identification of an HDD is made by a combination of the CE number, the DE number, and the slot number which are registered in the configuration management table 111.

For instance, for the volume number "LU#1" of FIG. 9, two HDDs mounted in the storage apparatus including CE#1 and two HDDs mounted in the storage apparatus including CE#2 are allocated as physical storage areas. Like this example, in the storage system, HDDs included in different storage apparatuses may be allocated to one logical volume as physical storage areas.

The volume management table 112 as described above is stored commonly in all CEs included in the storage system. When a logical volume is additionally defined in the storage system, the volume management table 112 in all CEs is updated. For instance, when a logical volume is defined in a CE, the volume management table 112 stored in the CE is updated and the defined information is distributed to all other CEs. Each CE updates the volume management table 112 stored in itself based on the defined information distributed from another CE.

Figure 10:
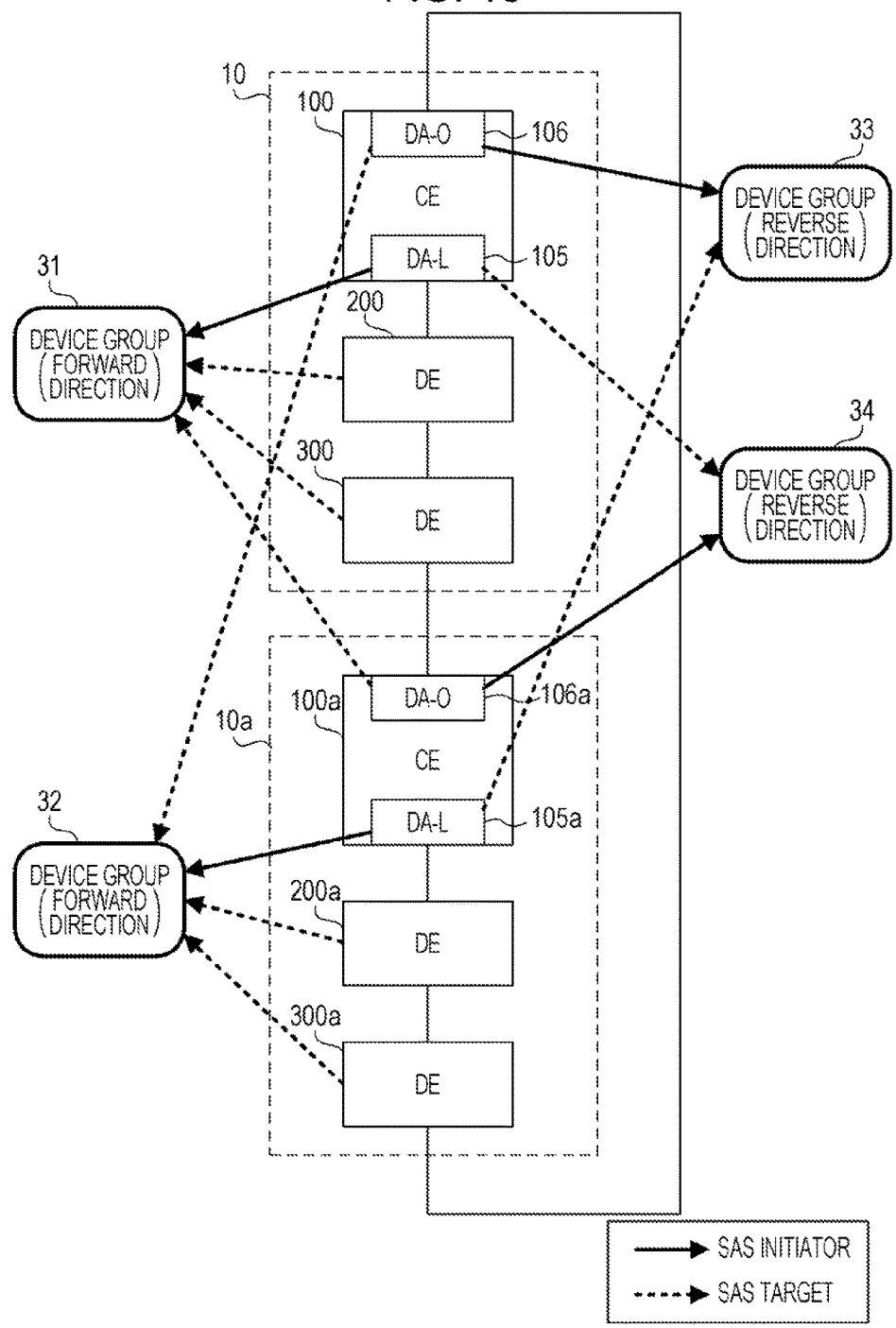
FIG. 10 is a diagram illustrating an exemplary device group including SAS devices.

Next, FIG. 10 is a diagram illustrating an exemplary device group including SAS devices. The device group is a unit of SAS devices whose operations are controlled by one SAS initiator. A device group includes a SAS initiator and one or more SAS targets. Each device included in a device group is a SAS device coupled with one local transmission path described with reference to FIG. 4 or FIG. 6.

For instance, in a storage system in the configuration illustrated in FIG. 10, device groups are set as follows. It is to be noted that in the following description, communication started by a CE transmitting a command from DA-L is called "forward communication" in the loop-form communication path, and communication started by a CE transmitting a command from DA-O is called "reverse communication" in the loop-form communication path. In the configuration of FIG. 10, forward communication corresponds to communication in which a command is transmitted in the counter-clockwise direction, and reverse communication corresponds to communication in which a command is transmitted in the clockwise direction.

A device group in forward communication includes a DA-L as a SAS initiator and includes, as SAS targets, HDDs in each DE included in the same storage apparatus to which the DA-L belongs. The last SAS target included in the device group is a DA-O in the same storage apparatus to which the DA-L belongs or in the subsequent storage apparatus.

In the example of FIG. 10, two device groups 31, 32 are set in forward communication. The device group 31 includes the DA-L 105 of the CE 100 as the SAS initiator, and includes the HDDs in the DEs 200, 300 and the DA-O 106*a* of the CE 100*a* as the SAS targets. The device group 32 includes the DA-L 105*a* of the CE 100*a* as the SAS initiator, and includes HDDs in the DEs 200*a*, 300*a* and the DA-O 106 of the CE 100 as the SAS targets. In other words, the device group 31 corresponds to SAS devices coupled with the local transmission path 11 illustrated in FIG. 6, and the device group 32 corresponds to SAS devices coupled with the local transmission path 11*a* illustrated in FIG. 6.

For instance, in the device group 31, a command is transmitted from the DA-L 105 of the CE 100 in the forward direction, thereby making it possible for the CE 100 to read or write data from or to any HDD in the DEs 200, 300. As described later, a command from the DA-L 105 of the CE 100 to the DA-O 106*a* of the CE 100*a* is utilized for data communication between CEs.

On the other hand, a device group in reverse communication includes a DA-O as a SAS initiator, includes a DA-L in the same storage apparatus to which the DA-O belongs or in the preceding storage apparatus as the SAS target, and includes no HDD. In the example of FIG. 10, two device groups 33, 34 are set in reverse communication. The device group 33 includes the DA-O 106 of the CE 100 as the SAS initiator, and includes the DA-L 105*a* of the CE 100*a* as the SAS target. The device group 34 includes the DA-O 106*a* of the CE 100*a* as the SAS initiator, and includes the DA-L 105 of the CE 100 as the SAS target. As described later, in reverse communication, direct control from the SAS initiator over reading and writing from and to any HDD is not performed, and only data communication between CEs is performed.

FIG. 11 is a diagram illustrating an exemplary SAS map. A SAS map 113 is generated for each device group, and provides table information for holding a list of the SAS devices included in the device group.

The SAS map 113 includes the items of ID and SAS device. In the item of ID, a serial number assigned to each of the SAS devices included in the device group is pre-registered. In the item of SAS device, identification information of a corresponding SAS device is registered. Practically, as the identification information of a SAS device, for instance, a World Wide Name (WWN) uniquely assigned to the SAS device is registered.

In the head record of the SAS map 113, DA-L or DA-O which operates as a SAS initiator is registered, and in the second or subsequent record, an HDD which is a SAS target is registered. Also, in the last record (for instance, ID=127) of the SAS map 113, DA-O or DA-L which operates as a SAS target is registered.

In a SAS map 113 corresponding to a device group in forward communication, DA-L is registered as the SAS initiator at the head record, and DA-O is registered in the last record. On the other hand, in a SAS map 113 corresponding to a device group in reverse communication, DA-O is registered as the SAS initiator at the head record, and DA-L is registered in the last record. No HDD is registered in the latter SAS map 113.

The SAS initiator searches for any SAS device coupled with the SAS initiator in a discover process defined in the SAS, and automatically generates the SAS map 113. In the SAS map 113 in forward communication, an HDD coupled with the SAS switch 203 closer to the SAS initiator (DA-L) is registered in a record closer to the head. Therefore, the CE is able to manage HDDs registered in the SAS map 113 and HDDs (slot numbers) in each DE included in the same storage apparatus including the CE, which are registered in the configuration management table 111, by establishing a one-to-one correspondence between the HDDs.

Figure 12:
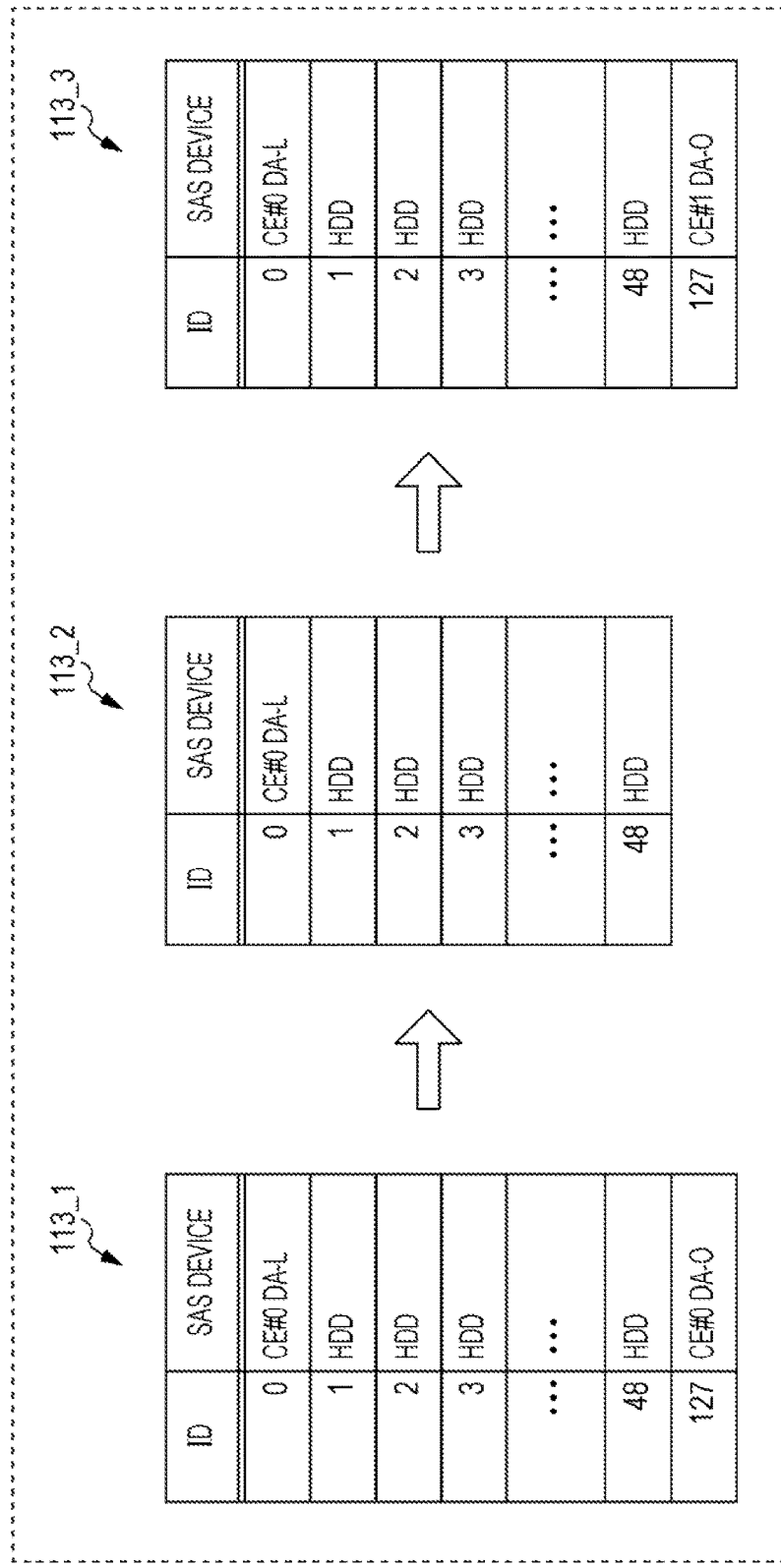
FIG. 12 is a diagram illustrating an exemplary change in a SAS map, which accompanies additional installation of a storage apparatus.

FIG. 12 is a diagram illustrating an exemplary change in the SAS map, which accompanies additional installation of a storage apparatus. FIG. 12 illustrates an example of change in the SAS map when a new storage apparatus 10a is additionally installed as illustrated in FIG. 6 in the state illustrated in FIG. 4.

In a SAS map 113_1 in the state illustrated in FIG. 4, SAS devices are registered that belong to a device group including the DA-L 105 of the CE 100 as the SAS initiator. The DA-L 105 detects HDDs mounted in the DEs 200, 300 and the DA-O 106 of the CE 100 as the SAS targets, and registers the detected devices to the SAS map 113_1.

It is assumed that 24 HDDs are mounted in each of the DEs 200, 300. Therefore, the HDDs mounted in the DE 200 are registered in the record from the 1st byte to the 24th byte in the SAS map 113_1, and the HDDs mounted in the DE 300 are registered in the record from the 25th byte to the 48th byte. It is to be noted that "CE#0" corresponds to the CE 100 in the SAS map 113_1.

When a new storage apparatus 10a is additionally installed, the O-port 302 of the DE 300 and the DA-O 106 of the CE 100 are first separated from each other in the state of FIG. 4. A SAS map 113_2 illustrated in FIG. 12 indicates the state at this point, and the separated DA-O 106 is deleted.

Subsequently, as illustrated in FIG. 6, the new storage apparatus 10a is coupled. A SAS map 113_3 illustrated in FIG. 12 indicates the state at this point. The DA-L 105 of the CE 100 detects that the DA-O 106a of the CE 100a has been coupled with the O-port of the DE 300, and registers the DA-O 106a to the 127th byte in the SAS map 113_3. It is to be noted that "CE#1" corresponds to the CE 100a in the SAS map 113_3.

In a device group, reading and writing from and to an HDD from the SAS initiator is controllable in accordance with standard SAS protocol. As illustrated in FIG. 10, as the HDDs serving as SAS targets, the device group includes only the HDDs included in the same storage apparatus to which the SAS initiator belongs. Thus, in the storage system of the present embodiment, the number of HDDs which may be included in each storage apparatus is close to the maximum number of SAS targets defined by the SAS, which may be included in a device group. Therefore, the number of HDDs additionally installable in the entire storage system becomes significantly high, and thus a large-scale system having high extensibility may be constructed.

However, transmission of an existing small computer system interface (SCSI) command between device groups is not possible. Thus, the present embodiment defines a dedicated command for transmitting a SCSI command between CEs.

FIGS. 13A and 13B are diagrams illustrating exemplary commands utilized in the second embodiment.

FIG. 13A illustrates the format of command descriptor block (CDB) in which Read command or Write command is defined. The CDB illustrated in FIG. 13A is defined by the SCSI standard.

An operation code is stored in the 0th byte. In the case of Read command, the operation code is "88h", and in the case of Write command, the operation code is "8Ah". LBA is stored in the 2nd byte to the 9th byte, and a data length is stored in the 10th byte to the 13th byte. The LBA indicates the head address of a read source or a write destination, and the data length indicates the size of Read data or Write data.

On the other hand, FIG. 13B illustrates an exemplary format of newly defined CDB for transmitting a Read command or a Write command between CEs. In the CDB illustrated in FIG. 13B, "C7h" is stored which is assigned as an operation code in the SCSI standard so as to be available by a vendor freely.

The 1st byte to the 4th byte are defined to designate a transmission destination HDD of a Read command or a Write command. For instance, a CE number is stored in the 1st byte and the 2nd byte, and a device number is stored in the 3rd byte and the 4th byte. The CE number indicates the number of the CE included in the same storage apparatus to which the transmission destination HDD belongs. The CE number is one of the CE numbers registered in the configuration management table 111. The device number includes the number of the DE in which the transmission destination HDD is mounted and the slot number of the HDD. These numbers are one of the DE numbers and one of the slot numbers registered in the configuration management table 111.

The 6th and subsequent bytes are defined as a command area, and a command area length indicating the size of the command area is stored in the 5th byte. The content of a Read command or a Write command transmitted between CEs is stored in the command area. Specifically, information stored in the command area includes at least an operation code, an LBA, and a data length of the information on CDB illustrated in FIG. 13A. The entire CDB illustrated in FIG. 13A may be stored in the command area.

In the following description, a command transmitted using the CDB illustrated in FIG. 13B is referred to as a "vendor unique (VU) command". The VU command is transmitted from a SAS initiator to a DA-L or DA-O among SAS targets in the same device group. The DA-L or DA-O which has received the VU command recognizes that the data is for transmitting a Read command or a Write command between CEs, based on the operation code in the VU command.

FIG. 14 is a sequence diagram illustrating exemplary processing when an HDD in another storage apparatus is accessed from a CE. FIG. 14 illustrates exemplary processing when the CE 100 reads data from an HDD in the DE 200a in a storage system in the configuration as in FIG. 6.

(S11) The CE 100 receives, from the host apparatus 400, a request for reading data from a logical volume. The CE 100 refers to the volume management table 112 to identify a read source HDD. It is assumed here that an HDD in the DE 200a is identified as the read source HDD.

The CE 100 starts processing to transmit a Read command to the identified HDD. It is assumed here that the CE 100 determines that the transmission destination HDD of the Read command is not subordinated to the CE 100 (the transmission destination HDD is not included in the same storage apparatus 10 to which the CE 100 belongs).

(S12) When it is determined that the transmission destination HDD is not subordinated to the CE 100, the CE 100 generates a VU command that including a Read command for reading data from the transmission destination HDD. The CE 100 transmits a SAS frame (command frame) including the generated VU command from the DA-L 105. The destination of the SAS frame is set to the DA-O 106a of the CE 100a on the basis of the SAS map 113 corresponding to the device group which includes the DA-L 105 as the SAS initiator.

(S13) The transmitted SAS frame is inputted to the SAS switch 203 via the I-port 201 of the DE 200. The SAS switch 203 transmits the SAS frame from the O-port 202 on the basis of the destination of the SAS frame. Thus, the VU command is transferred from the DE 200 to the DE 300.

(S14) The transmitted SAS frame is inputted to the SAS switch of the DE 300 via the I-port of the DE 300. The SAS switch transmits the SAS frame from the O-port of the DE 300 on the basis of the destination of the SAS frame. Thus, the VU command is transferred from the DE 300 to the CE 100a.

(S15) The CE 100a receives the transmitted SAS frame via the DA-O 106a. The CE 100a identifies a region (CDB) of the VU command from the SAS frame, and refers to a command area in the identified region to identify the transmission destination HDD. The CE 100a determines that the transmission destination HDD is subordinated to the CE 100a on the basis of the configuration management table 111.

(S16) When it is determined that the transmission destination HDD is subordinated to the CE 100a, the CE 100a transmits a SAS frame (command frame) including the Read command to the transmission destination HDD from the DA-L 105a.

(S17) The transmitted SAS frame is inputted to the SAS switch of the DE 200a via the I-port of the DE 200a. The SAS switch transmits the SAS frame to the relevant HDD on the basis of the destination of the SAS frame. The HDD which has received the SAS frame reads Read data in accordance with the Read command in the SAS frame.

(S18) The HDD transmits a SAS frame (data frame) including the read Read data to the DA-L 105a of the CE 100a, which is a SAS initiator. The SAS frame is transmitted to the CE 100a via the SAS switch and the I-port in the DE 200a.

(S19) The CE 100a receives the transmitted SAS frame via the DA-L 105a. The CE 100a determines that the received SAS frame is a response to the SAS frame transmitted in S16, and transmits a SAS frame (data frame) from the DA-O 106a as a response to the SAS command received in S15. The SAS frame includes the Read data, and the DA-L 105 of the CE 100 serving as a SAS initiator is set as the destination.

(S20) The transmitted SAS frame is inputted to the SAS switch of the DE 300 via the O-port of the DE 300. The SAS switch transmits the SAS frame from the I-port of the DE 300 on the basis of the destination of the SAS frame. Thus, the Read data is transferred from the DE 300 to the DE 200.

(S21) The transmitted SAS frame is inputted to the SAS switch 203 via the O-port 202 of the DE 200. The SAS switch 203 transmits the SAS frame from the I-port 201 on the basis of the destination of the SAS frame. Thus, the Read data is transferred from the DE 200 to the CE 100.

(S22) The CE 100 receives the transmitted SAS frame via the DA-L 105. The CE 100 determines that the received SAS frame is a response to the SAS frame transmitted in S12, and the CE 100 transmits, as a response to the host apparatus 400, the Read data extracted from the SAS frame to the host apparatus 400.

By the processing of FIG. 14 described above, the CE is able to transfer a Read command to another CE using the VU command. By using the VU command, transfer of a Read command (and a Write command) between CEs may be achieved without changing the SAS protocol significantly. Thus, it is possible to achieve a highly scalable storage system having high extensibility with a low cost.

Here, the data transmission and reception processing in S12 to S14 and S19 to S21 is data transmission and reception processing within the device group 31 (see FIG. 10). On the other hand, the data transmission and reception processing in S16 and S18 is data transmission and reception processing in the device group 32 (see FIG. 10). In other words, the former processing and the latter processing are independent processing on the SAS protocol.

Thus, for instance, when a storage apparatus 10a is additionally installed in a storage system including the storage apparatus 10 only, the communication processing between the SAS initiator and an HDD within the new storage apparatus 10a has no particular effect on the communication processing between the SAS initiator and an HDD within the storage apparatus 10. Like this, additional installation of a storage apparatus in the storage system is substantially equivalent to adding a communication system, in which communication is independently performed, to the system. Therefore, even when a storage apparatus is additionally installed, only the configuration management table 111 is updated and the basic communication control procedure in the entire storage system is not changed, and thus additional installation work is made easy.

In short, in the above-described storage system, an independently-controlled communication system is added to the storage system by additional installation of a storage apparatus. And then, data passing between such independent communication systems is achieved by the VU command described above. This mechanism achieves a storage system that is easily extended and highly scalable.

FIG. 15 is a sequence diagram illustrating another exemplary processing when an HDD in another storage apparatus is accessed from a CE.

An example of forward communication has been described with reference to FIG. 14 above. In the case of reverse communication, for instance, the processing as illustrated in FIG. 15 is performed. Here, as an example, FIG. 15 illustrates exemplary processing when the CE 100 reads data from an HDD in the DE 200c in the storage system in the configuration as in FIG. 7.

(S31) The CE 100 receives, from the host apparatus 400, a request for reading data from a logical volume. The CE 100 refers to the volume management table 112 to identify a read source HDD. It is assumed here that an HDD in the DE 200c is identified as the read source HDD.

The CE 100 starts processing to transmit a Read command to the identified HDD. It is assumed here that the CE 100 determines that the transmission destination HDD of a Read command is not subordinated to the CE 100 (the transmission destination HDD is not included in the same storage apparatus 10 to which the CE 100 belongs). It is further assumed that the CE 100 determines that a path to the transmission destination HDD is shorter in a case of reverse communication than in a case of forward communication. This determination may be made by tracing a path to the transmission destination HDD, for instance, based on the configuration management table 111. Alternatively, the determination may be made based on a hop number table described later.

(S32) When it is determined that the transmission destination HDD is not subordinated to the CE 100, the CE 100 generates a VU command that includes a Read command for reading data from the transmission destination HDD. The CE 100 transmits a SAS frame (command frame) including the generated VU command from the DA-O 106. The destination of the SAS frame is set to the DA-L of the CE 100c on the basis of the SAS map 113 corresponding to the device group which includes the DA-O 106 as the SAS initiator.

(S33) The transmitted SAS frame is inputted to the SAS switch of the DE 300c via the O-port of the DE 300c. The SAS switch transmits the SAS frame from the I-port of the DE 300c on the basis of the destination of the SAS frame. Thus, the VU command is transferred from the DE 300c to the DE 200c.

(S34) The transmitted SAS frame is inputted to the SAS switch of the DE 200c via the O-port of the DE 200c. The SAS switch transmits the SAS frame from the I-port of the DE 200c on the basis of the destination of the SAS frame. Thus, the VU command is transferred from the DE 200c to the CE 100c.

(S35) The CE 100c receives the transmitted SAS frame via the DA-L 105c. The CE 100c identifies a region (CDB) of the VU command from the SAS frame, and refers to a command area in the identified region to identify the transmission destination HDD. The CE 100c determines that the transmission destination HDD is subordinated to the CE 100c on the basis of the configuration management table 111.

(S36) When it is determined that the transmission destination HDD is subordinated to the CE 100c, the CE 100c transmits a SAS frame (command frame) including a Read command to the transmission destination HDD from the DA-L 105c.

(S37) The transmitted SAS frame is inputted to the SAS switch of the DE 200c via the I-port of the DE 200c. The SAS switch transmits the SAS frame to the relevant HDD on the basis of the destination of the SAS frame. The HDD which has received the SAS frame reads Read data in accordance with the Read command in the SAS frame.

(S38) The HDD transmits a SAS frame (data frame) including the read Read data to the DA-L 105c of the CE 100c, which is the SAS initiator. The SAS frame is transmitted to the CE 100c via the SAS switch and the I-port in the DE 200c.

(S39) The CE 100c receives the transmitted SAS frame via the DA-L 105c. The CE 100c determines that the received SAS frame is a response to the SAS frame transmitted in S36, and transmits a SAS frame (data frame) from the DA-L 105c as a response to the SAS command received in S35. The SAS frame includes the Read data, and the DA-O 106 of the CE 100 serving as a SAS initiator is set as the destination.

(S40) The transmitted SAS frame is inputted to the SAS switch of the DE 200c via the I-port of the DE 200c. The SAS switch transmits the SAS frame from the O-port of the DE 200c on the basis of the destination of the SAS frame. Thus, the Read data is transferred from the DE 200c to the DE 300c.

(S41) The transmitted SAS frame is inputted to the SAS switch of the DE 300c via the I-port of the DE 300c. The SAS switch transmits the SAS frame from the O-port of the DE 300c on the basis of the destination of the SAS frame. Thus, the Read data is transferred from the DE 300c to the CE 100.

(S42) The CE 100 receives the transmitted SAS frame via the DA-O 106. The CE 100 determines that the received SAS frame is a response to the SAS frame transmitted in S32, and transmits, as a response to the host apparatus 400, the Read data extracted from the SAS frame to the host apparatus 400.

As in the processing of FIG. 15 described above, in reverse communication, a Read command is once transmitted to the CE in the same storage apparatus to which the transmission destination HDD belongs, using a VU command, and is transmitted from the CE to the transmission destination HDD. The same holds for Write command.

Figure 16:
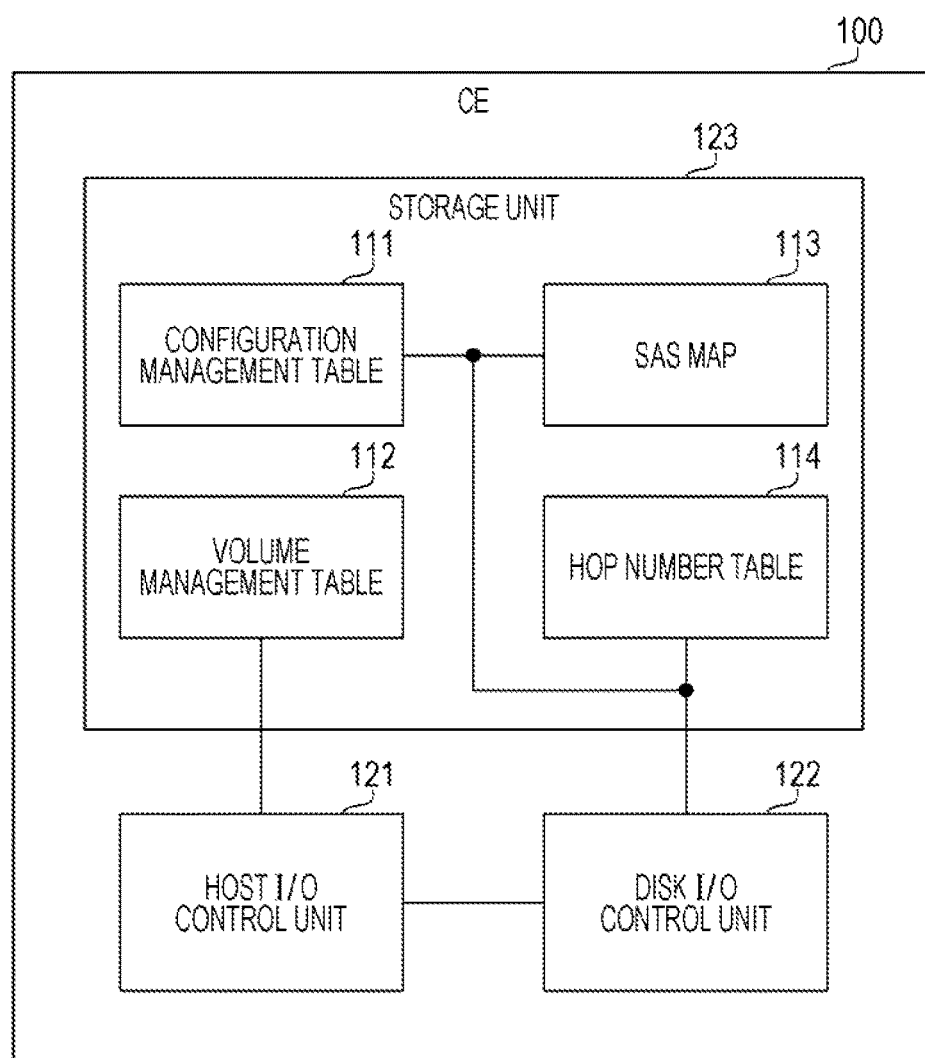
FIG. 16 is a diagram illustrating an exemplary configuration of a processing function of a CE.

Next, FIG. 16 is a diagram illustrating an exemplary configuration of the processing function of a CE. Although FIG. 16 illustrates the CE 100 as an example, another CE (for instance, the CEs 100a, 100b, 100c) also has a processing function in the same configuration.

The CE 100 includes a host I/O control unit 121, a disk I/O control unit 122, and a storage unit 123. In addition to the above-described configuration management table 111, the volume management table 112, and the SAS map 113, a hop number table 114 is stored in the storage unit 123. The processing of the host I/O control unit 121 and the disk I/O control unit 122 is achieved by the processor 101 included in the CE 100 by executing a predetermined application program. The storage unit 123 is mounted as a storage area of a memory device (for instance, the RAM 102 or the SSD 103) included in the CE 100, for instance.

The host I/O control unit 121 controls communication between the CE 100 and the host apparatus 400 coupled with the CE 100. Specifically, upon receiving an access request to a logical volume from the host apparatus 400, the host I/O control unit 121 determines an access destination HDD on the basis of the volume management table 112. The host I/O control unit 121 then requests the disk I/O control unit 122 for access to the determined HDD.

The disk I/O control unit 122 controls, by using the SAS protocol, the communication for accessing an HDD. For instance, upon receiving an access request to an HDD from the host I/O control unit 121, the disk I/O control unit 122 transmits a SAS frame including a command for accessing the HDD from the DA-L 105 or the DA-O 106. In addition, upon receiving a SAS frame from the DA-L 105 or the DA-O 106, the disk I/O control unit 122 determines an information transmission destination on the basis of the SAS frame. For instance, when a SAS frame including a VU command for accessing an HDD subordinated to the CE 100 is received, the disk I/O control unit 122 transmits from the DA-L 105 a SAS frame including a Read command or a Write command to the HDD. Also, when a SAS frame including a VU command for accessing an HDD subordinated to another CE is received, the disk I/O control unit 122 transfers the VU command. When the VU command is received from the DA-O 106, the disk I/O control unit 122 transfers the VU command from the DA-L 105, and when the VU command is received from the DA-L 105, the disk I/O control unit 122 transfers the VU command from the DA-O 106.

In the hop number table 114, information indicating how many CEs are present between the CE 100 and another CE is registered.

Figure 17:
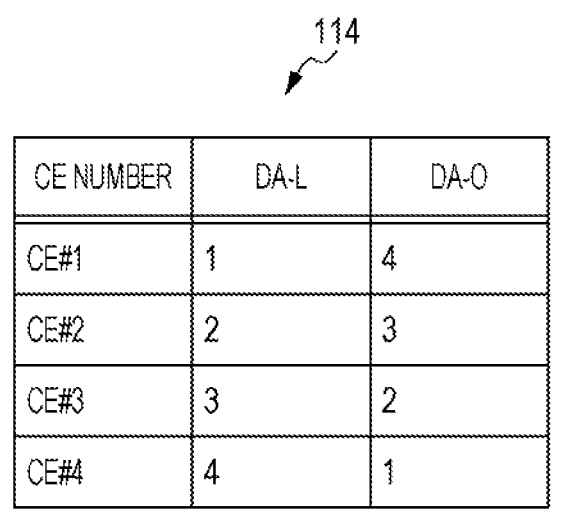

FIG. 17 is a diagram illustrating an exemplary hop number table. The hop number table 114 includes the items of CE number, DA-L, and DA-O.

In the item of CE number, an identification number of another CE included in the storage system is registered. In the item of DA-L, a numerical value indicating the ordinal number of the corresponding other CE among the coupled CEs in the system in the direction (forward direction) of DA-L is registered. In the item of DA-O, a numerical value indicating the ordinal number of the corresponding other CE among the coupled CEs in the system in the direction (reverse direction) of DA-O is registered.

The hop number table 114 is generated based on the configuration management table 111, for instance. For instance, each time the configuration management table 111 is updated, the CE 100 also updates the hop number table 114. The hop number table 114 is referred by the disk I/O control unit 122 to determine one of the forward direction and the reverse direction in which a VU command is to be transmitted.

Next, the processing of a CE will be described using the flowchart. In the following, the processing of the CE 100 will be described as an example.

Figure 18:
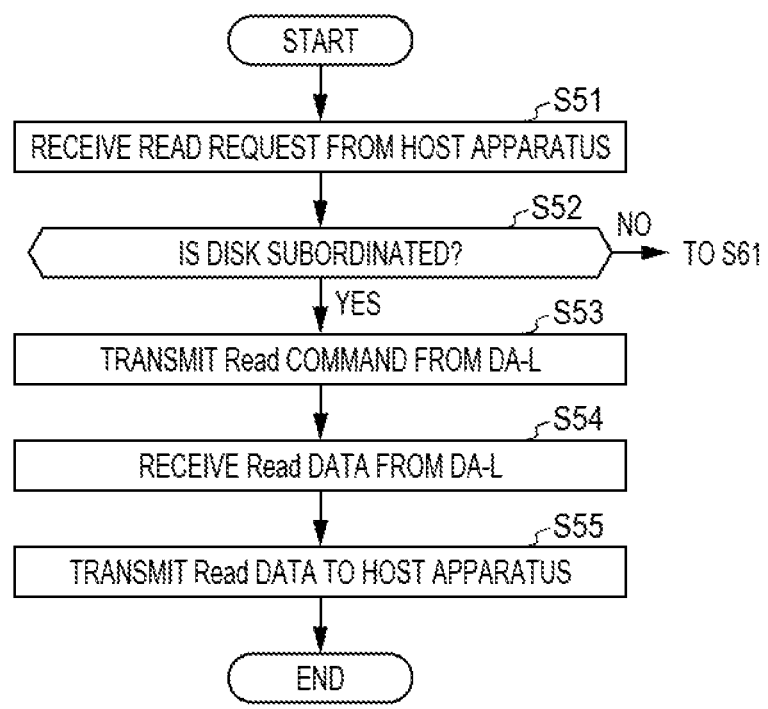
FIG. 18 is a flowchart illustrating exemplary processing when a request for reading from a logical volume is received from a host apparatus.
Figure 19:
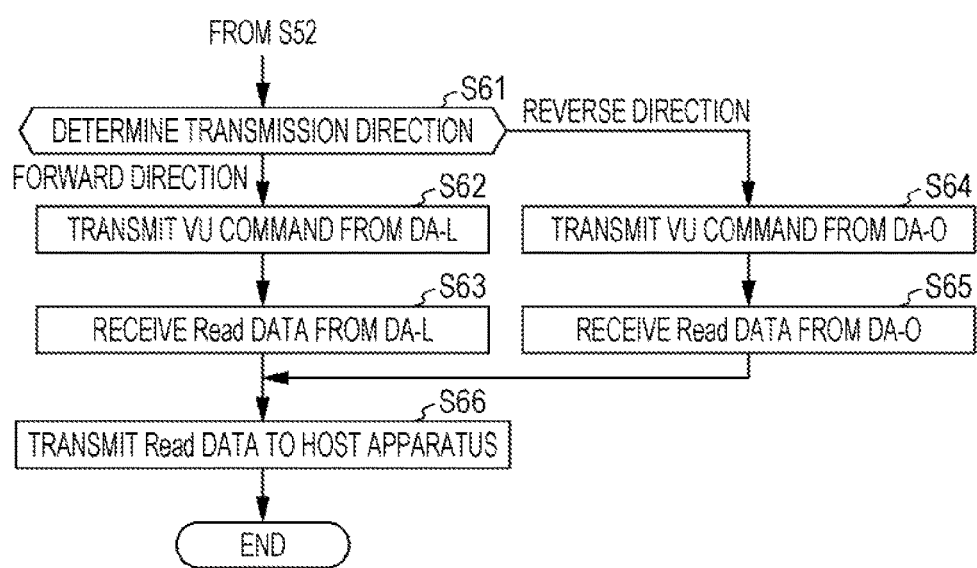
FIG. 19 is a flowchart illustrating exemplary processing when a request for reading from a logical volume is received from a host apparatus.

First, FIGS. 18 and 19 are flowcharts illustrating exemplary processing when a request for reading from a logical volume is received from a host apparatus.

(S51) The host I/O control unit 121 receives a read request designating a logical volume and a read source area from the host apparatus 400. The host I/O control unit 121 refers to the record of the designated logical volume in the volume management table 112, and identifies the location of an HDD corresponding to the read source area and a read source area in the HDD.

Although multiple pairs of an HDD and a read source area may be identified at this point, in order to facilitate the description, only one pair of an HDD and a read source area is assumed to be identified in the following.

(S52) The host I/O control unit 121 notifies the disk I/O control unit 122 of the location of the HDD and the read source area, and requests for data read. The disk I/O control unit 122 determines whether the HDD notified is subordinated to the CE 100 on the basis of the configuration management table 111. The HDD subordinated to the CE 100 indicates an HDD in a DE included in the same storage apparatus 10 to which the CE 100 belongs, and this is an HDD indicated by one of the slot numbers associated with the CE 100 in the configuration management table 111.

When the HDD notified is an HDD subordinated to the CE 100, the processing in S53 is performed. When the HDD notified is an HDD subordinated to another CE, the processing in S61 is performed.

(S53) The disk I/O control unit 122 transmits from the DA-L 105 a SAS frame (command frame) designating the HDD notified in S52 as a transmission destination. The SAS frame includes a Read command in which the read source area notified in S52 is set.

(S54) The disk I/O control unit 122 receives a SAS frame (data frame) from the DA-L 105 as a response to the SAS frame transmitted in S53. The SAS frame includes Read data read from the read source area.

(S55) The disk I/O control unit 122 transfers Read data extracted from the received SAS frame to the host I/O control unit 121. The host I/O control unit 121 transmits Read data to the host apparatus 400 as a response to the read request received in S51.

(S61) The disk I/O control unit 122 determines a transmission direction of a VU command on the basis of the hop number table 114. Specifically, out of the records of the hop number table 114, the disk I/O control unit 122 refers to a record corresponding to a CE in the same storage apparatus to which the HDD notified in S52 belongs. Based on the record, the disk I/O control unit 122 determines from which one of DA-L and DA-O, transmission of a VU results in less number of other CEs present between the CE 100 and the transmission destination.

When transmission from the DA-L results in less number of other CEs, the disk I/O control unit 122 determines that the transmission direction is forward and performs the processing in S62. On the other hand, when transmission from the DA-O results in less number of other CEs, the disk I/O control unit 122 determines that the transmission direction is reverse and performs the processing in S64.

(S62) The disk I/O control unit 122 transmits from the DA-L 105 a SAS frame (command frame) designating the DA-O coupled with the DA-L 105 as a transmission destination. In the SAS frame, information indicating the location of the HDD notified in S52 is set to the fields of CE number and device number. The SAS frame includes a VU command having a command area in which a Read command including the read source area notified in S52 is set.

(S63) The disk I/O control unit 122 receives a SAS frame (data frame) from the DA-L 105 as a response to the SAS frame transmitted in S62. The SAS frame includes Read data which is read from the read source area.

(S64) The disk I/O control unit 122 transmits from the DA-O 106 a SAS frame (command frame) designating the DA-L coupled with the DA-O 106 as a transmission destination. In the SAS frame, information indicating the location of the HDD notified in S52 is set to the fields of CE number and device number. The SAS frame includes a VU command having a command area in which a Read command including the read source area notified in S52 is set.

(S65) The disk I/O control unit 122 receives a SAS frame (data frame) from the DA-O 106 as a response to the SAS frame transmitted in S64. The SAS frame includes Read data which is read from the read source area.

(S66) The disk I/O control unit 122 extracts Read data from the SAS frame received in S63 or S65, and transfers the extracted Read data to the host I/O control unit 121. The host I/O control unit 121 transmits the Read data to the host apparatus 400 as a response to the read request received in S51.

Figure 20:
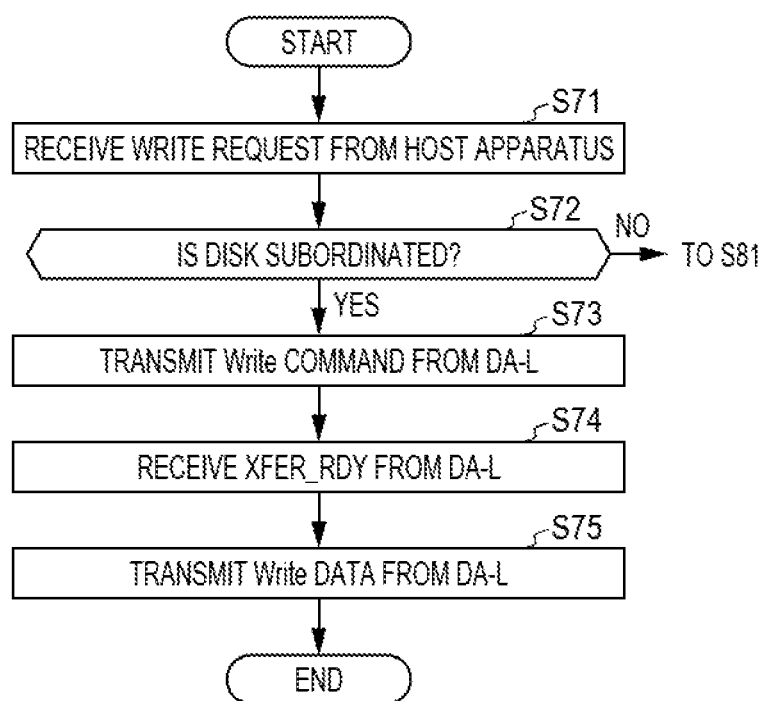
FIG. 20 is a flowchart illustrating exemplary processing when a request for writing to a logical volume is received from a host apparatus.
Figure 21:
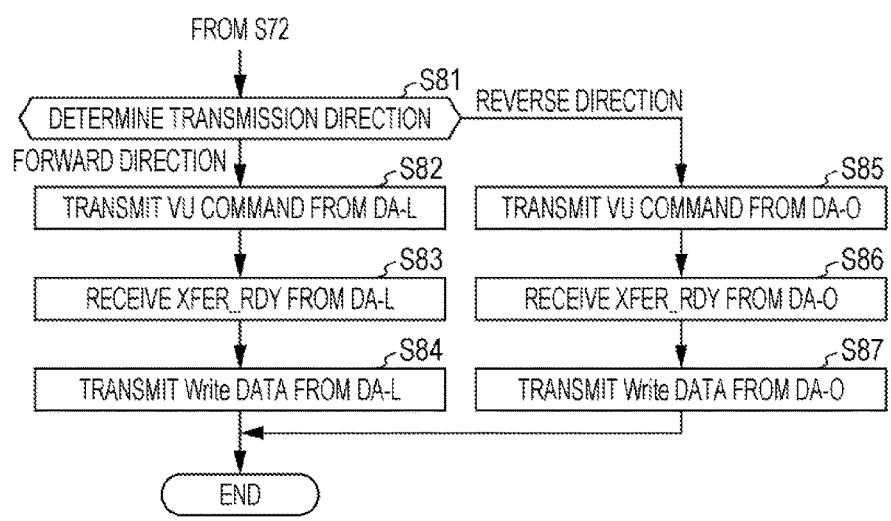
FIG. 21 is a flowchart illustrating exemplary processing when a request for writing to a logical volume is received from a host apparatus.

FIGS. 20 and 21 are flowcharts illustrating exemplary processing when a request for writing to a logical volume is received from a host apparatus.

(S71) The host I/O control unit 121 receives from the host apparatus 400 a write request designating a logical volume and a write destination area along with Write data. The host I/O control unit 121 refers to the record of the designated logical volume in the volume management table 112, and identifies the location of an HDD corresponding to the write destination area and a write destination area in the HDD.

Although multiple pairs of an HDD and a write destination area may be identified at this point, in order to facilitate the description, only one pair of an HDD and a write destination area is assumed to be identified in the following.

(S72) The host I/O control unit 121 notifies the disk I/O control unit 122 of the location of an HDD, a write destination area, and Write data, and requests for data write. The disk I/O control unit 122 determines whether the HDD notified is subordinated to CE 100 on the basis of the configuration management table 111. When the notified HDD is an HDD subordinated to the CE 100, the processing in S73 is performed. When the notified HDD is an HDD subordinated to another CE, the processing in S81 is performed.

(S73) The disk I/O control unit 122 transmits from the DA-L 105 a SAS frame (command frame) designating the HDD notified in S72 as a transmission destination. The SAS frame includes a Write command in which the write destination area notified in S72 is set.

(S74) The disk I/O control unit 122 receives a SAS frame (XFER_RDY frame, where XFER_RDY stands for Transfer Ready) from the DA-L 105 as a response to the SAS frame transmitted in S73. The XFER_RDY frame indicates that preparation for writing data is made.

(S75) The disk I/O control unit 122 transmits from the DA-L 105 a SAS frame (data frame) designating the HDD notified in S72 as a transmission destination. The SAS frame includes the Write data notified in S72.

(S81) The disk I/O control unit 122 determines a transmission direction of a VU command on the basis of the hop number table 114. Specifically, out of the records of the hop number table 114, the disk I/O control unit 122 refers to a record corresponding to a CE in the same storage apparatus to which the HDD notified in S72 belongs. Based on the record, the disk I/O control unit 122 determines from which one of DA-L and DA-O, transmission of a VU results in less number of other CEs present between the CE 100 and the transmission destination.

When transmission from the DA-L results in less number of other CEs, the disk I/O control unit 122 determines that the transmission direction is forward and performs the processing in S82. On the other hand, when transmission from the DA-O results in less number of other CEs, the disk I/O control unit 122 determines that the transmission direction is reverse and performs the processing in S85.

(S82) The disk I/O control unit 122 transmits from the DA-L 105 a SAS frame (command frame) designating the DA-O coupled with the DA-L 105 as a transmission destination. In the SAS frame, information indicating the location of the HDD notified in S72 is set to the fields of CE number and device number. The SAS frame includes a VU command having a command area in which a Write command including the write destination area notified in S72 is set.

(S83) The disk I/O control unit 122 receives a SAS frame (XFER_RDY frame) from the DA-L 105 as a response to the SAS frame transmitted in S82.

(S84) The disk I/O control unit 122 transmits from the DA-L 105 a SAS frame (data frame) designating the DA-O coupled with the DA-L 105 as a transmission destination. The SAS frame includes the Write data notified in S72.

(S85) The disk I/O control unit 122 transmits from the DA-O 106 a SAS frame (command frame) designating the DA-L coupled with the DA-O 106 as a transmission destination. In the SAS frame, information indicating the location of the HDD notified in S72 is set to the fields of CE number and device number. The SAS frame includes a VU command having a command area in which a Write command including the write destination area notified in S72 is set.

(S86) The disk I/O control unit 122 receives a SAS frame (XFER_RDY frame) from the DA-O 106 as a response to the SAS frame transmitted in S85.

(S87) The disk I/O control unit 122 transmits from the DA-O 106 a SAS frame (data frame) designating the DA-L coupled with the DA-O 106 as a transmission destination. The SAS frame includes the Write data notified in S72.

Although not illustrated, when transmission of Write data is completed in one of S75, S84, and S87, the disk I/O control unit 122 notifies the host I/O control unit 121 of the completion of transmission of Write data. The host I/O control unit 121 transmits information in response to the write request received in S71 to the host apparatus 400.

Figure 22:
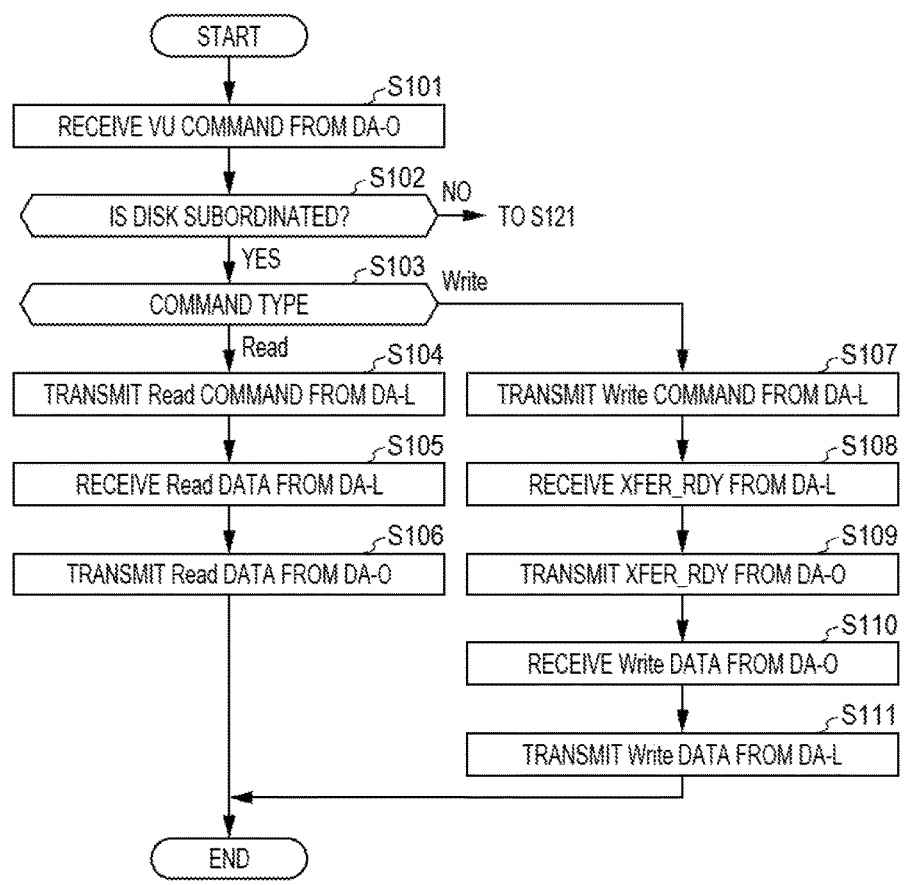
FIG. 22 is a flowchart illustrating exemplary processing when a VU command is received from DA-O.
Figure 23:
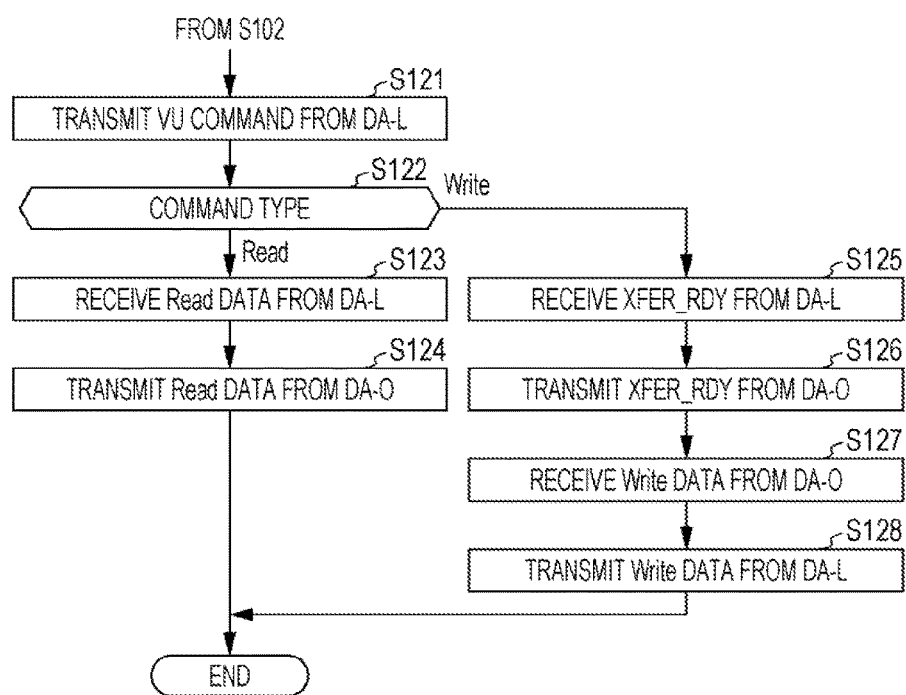
FIG. 23 is a flowchart illustrating exemplary processing when a VU command is received from DA-O.

Next, FIGS. 22 and 23 are flowcharts illustrating exemplary processing when a VU command is received from DA-O.

(S101) The disk I/O control unit 122 receives a SAS frame (command frame) including a VU command from the DA-O 106.

(S102) The disk I/O control unit 122 determines whether or not an access destination HDD indicated by the CE number and the device number set in the received VU command is subordinated to CE 100, based on the configuration management table 111. When the access destination HDD is subordinated to the CE 100, the disk I/O control unit 122 performs the processing in S103, and when the access destination HDD is subordinated to another CE, the disk I/O control unit 122 performs the processing in S121.

(S103) The disk I/O control unit 122 determines whether the command type set in the command area of the received VU command is Read command or Write command. The disk I/O control unit 122 performs the processing in S104 in the case of Read command and performs the processing in S107 in the case of Write command.

(S104) The disk I/O control unit 122 transmits from the DA-L 105 a SAS frame (command frame) designating an HDD indicated by the CE number and the device number of the VU command as a transmission destination. The SAS frame includes a Read command in which a read source area is set. The read source area is defined in the command area of the VU command.

(S105) The disk I/O control unit 122 receives a SAS frame (data frame) from the DA-L 105 as a response to the SAS frame transmitted in S104. The SAS frame includes Read data which is read from the read source area.

(S106) The disk I/O control unit 122 transmits a SAS frame (data frame) from the DA-O 106 as a response to the SAS frame received in S101. The transmission destination of the SAS frame is the DA-L (the DA-L 105c of the CE 100c in the example of FIG. 7) of the CE of the preceding storage apparatus coupled with the DA-O 106. The SAS frame includes Read data extracted from the SAS frame received in S105.

(S107) The disk I/O control unit 122 transmits from the DA-L 105 a SAS frame (command frame) designating an HDD indicated by the CE number and the device number of the VU command as a transmission destination. The SAS frame includes a Write command in which a write destination area is set. The write destination area is defined in the command area of the VU command.

(S108) The disk I/O control unit 122 receives a SAS frame (XFER_RDY frame) from the DA-L 105 as a response to the SAS frame transmitted in S107.

(S109) The disk I/O control unit 122 transmits a SAS frame (XFER_RDY frame) from the DA-O 106 as a response to the SAS frame received in S101. The transmission destination of the SAS frame is the DA-L (the DA-L 105c of the CE 100c in the example of FIG. 7) of the CE of the preceding storage apparatus coupled with the DA-O 106.

(S110) The disk I/O control unit 122 receives a SAS frame (data frame) from the DA-O 106 as a response to the SAS frame transmitted in S109. The SAS frame includes Write data.

(S111) The disk I/O control unit 122 transmits from the DA-L 105 a SAS frame (data frame) designating the same HDD as in the SAS frame transmitted in S107, as a transmission destination. The SAS frame includes the Write data received in S110. Thus, the Write data is written to the HDD at the transmission destination of the SAS frame.

(S121) The disk I/O control unit 122 transmits a SAS frame (command frame) including a VU command from the DA-L 105. The transmission destination of the SAS frame is the DA-O (the DA-O 106a of the CE 100a in the example of FIG. 7) of the CE of the subsequent storage apparatus coupled with the DA-L 105. In the SAS frame, the same content as that of the SAS frame received in S101 is set except for the transmission destination.

(S122) When the command type set in the VU command of the SAS frame transmitted in S121 is Read command, the disk I/O control unit 122 performs the processing in S123, and when the command type is Write command, the disk I/O control unit 122 performs the processing in S125.

(S123) The disk I/O control unit 122 receives a SAS frame (data frame) from the DA-L 105 as a response to the SAS frame transmitted in S121. The SAS frame includes Read data which is read from a read source area.

(S124) The disk I/O control unit 122 transmits a SAS frame (data frame) from the DA-O 106 as a response to the SAS frame received in S101. The transmission destination of the SAS frame is the same as the transmission destination of the SAS frame in S106. The SAS frame includes Read data extracted from the SAS frame received in S123.

(S125) The disk I/O control unit 122 receives a SAS frame (XFER_RDY frame) from the DA-L 105 as a response to the SAS frame transmitted in S121.

(S126) The disk I/O control unit 122 transmits a SAS frame (XFER_RDY frame) from the DA-O 106 as a response to the SAS frame received in S101. The transmission destination of the SAS frame is the same as the transmission destination of the SAS frame in S109.

(S127) The disk I/O control unit 122 receives a SAS frame (data frame) from the DA-O 106 as a response to the SAS frame transmitted in S126. The SAS frame includes Write data.

(S128) The disk I/O control unit 122 transmits from the DA-L 105 a SAS frame (data frame) designating the same SAS device (DA-O) as in the SAS frame transmitted in S121, as a transmission destination. The SAS frame includes the Write data received in S127. Thus, the Write data is transferred to the CE of the subsequent storage apparatus.

Figure 24:
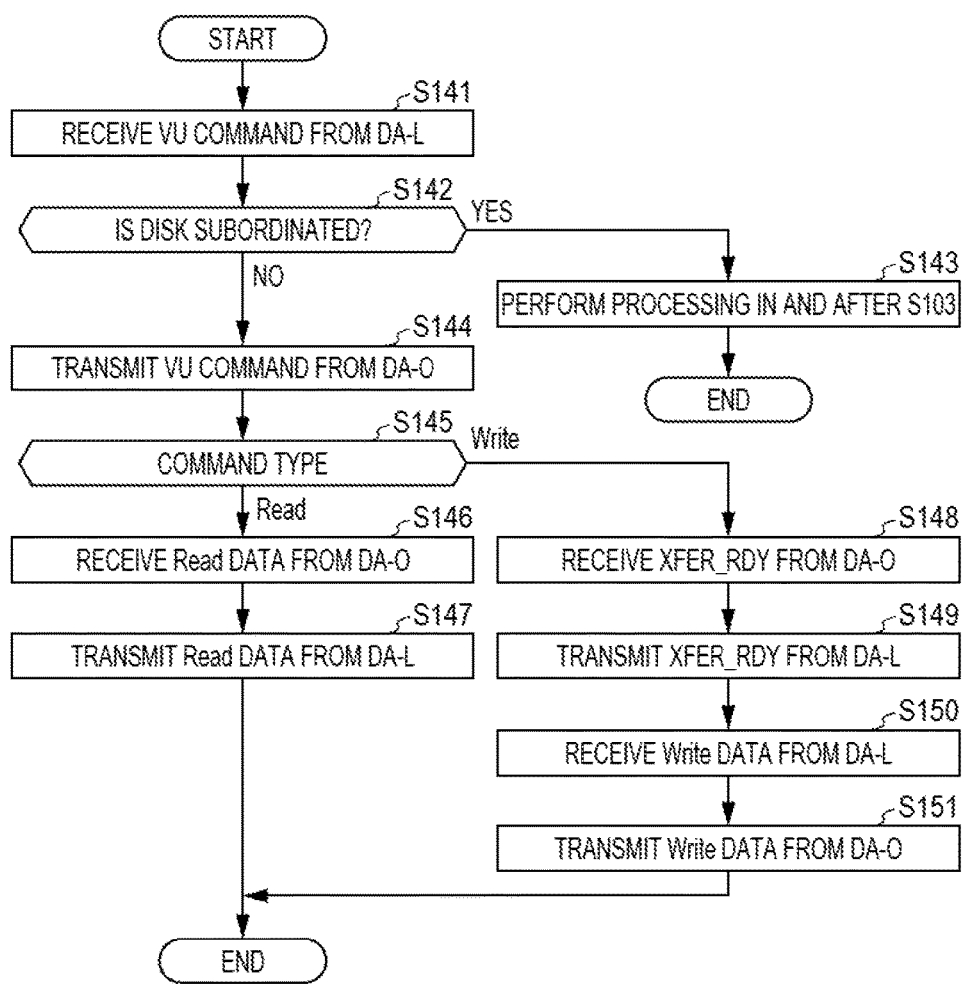
FIG. 24 is a flowchart illustrating exemplary processing when a VU command is received from DA-L.

FIG. 24 is a flowchart illustrating exemplary processing when a VU command is received from DA-L.

(S141) The disk I/O control unit 122 receives a SAS frame (command frame) including a VU command from the DA-L 105.

(S142) The disk I/O control unit 122 determines whether or not an access destination HDD indicated by the CE number and the device number set in the received VU command is subordinated to the CE 100, based on the configuration management table 111. When the access destination HDD is subordinated to the CE 100, the disk I/O control unit 122 performs the processing in S143, and when the access destination HDD is subordinated to another CE, the disk I/O control unit 122 performs the processing in S144.

(S143) Processing in S103 of FIG. 22 and after is performed.

(S144) The disk I/O control unit 122 transmits a SAS frame (command frame) including a VU command from the DA-O 106. The transmission destination of the SAS frame is the DA-L (the DA-L 105c of the CE 100c in the example of FIG. 7) of the CE of the preceding storage apparatus coupled with the DA-O 106. In the SAS frame, the same content as that of the SAS frame received in S141 is set except for the transmission destination.

(S145) When the command type set in the VU command of the SAS frame transmitted in S144 is Read command, the disk I/O control unit 122 performs the processing in S146, and when the command type is Write command, the disk I/O control unit 122 performs the processing in S148.

(S146) The disk I/O control unit 122 receives a SAS frame (data frame) from the DA-O 106 as a response to the SAS frame transmitted in S144. The SAS frame includes Read data which is read from a read source area.

(S147) The disk I/O control unit 122 transmits a SAS frame (data frame) from the DA-L 105 as a response to the SAS frame received in S141. The transmission destination of the SAS frame is the DA-O (the DA-O 106 of the CE 100a in the example of FIG. 7) of the CE of the subsequent storage apparatus coupled with the DA-L 105. The SAS frame includes Read data extracted from the SAS frame received in S146.

(S148) The disk I/O control unit 122 receives a SAS frame (XFER_RDY frame) from the DA-O 106 as a response to the SAS frame transmitted in S144.

(S149) The disk I/O control unit 122 transmits a SAS frame (XFER_RDY frame) from the DA-L 105 as a response to the SAS frame received in S141. The transmission destination of the SAS frame is the same as the transmission destination of the SAS frame in S147.

(S150) The disk I/O control unit 122 receives a SAS frame (data frame) from the DA-L 105 as a response to the SAS frame transmitted in S149. The SAS frame includes the Write data.

(S151) The disk I/O control unit 122 transmits from the DA-O 106 a SAS frame (data frame) designating the same SAS device (DA-L) as in the SAS frame transmitted in S144, as a transmission destination. The SAS frame includes the Write data received in S150. Thus, the Write data is transferred to the CE of the preceding storage apparatus.

It is to be noted that the SAS switch in a DE only transfers a received SAS frame from a port in the direction to a SAS device at a transmission destination, and thus illustration of the processing of the SAS switch is omitted.

Figure 25:
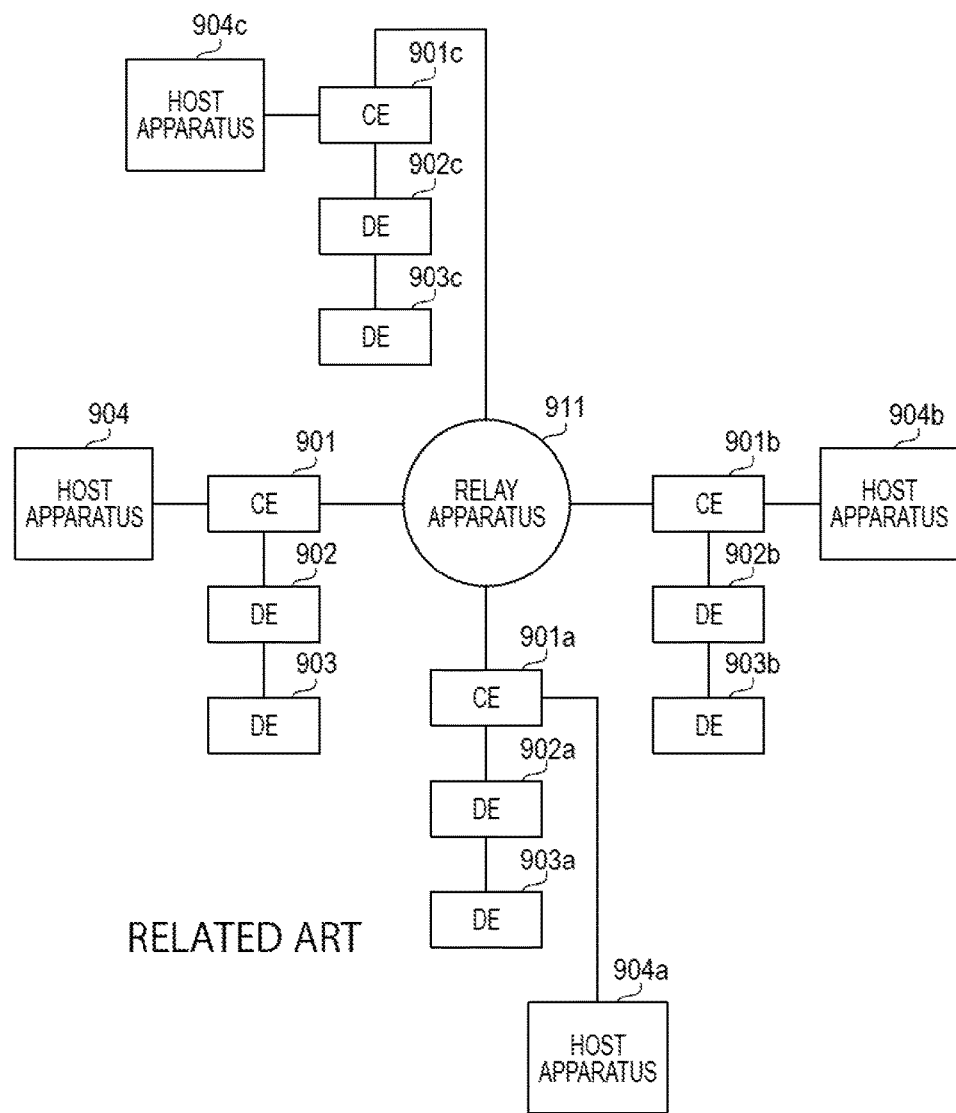
FIG. 25 is a diagram illustrating a first example for comparison.
Figure 26:
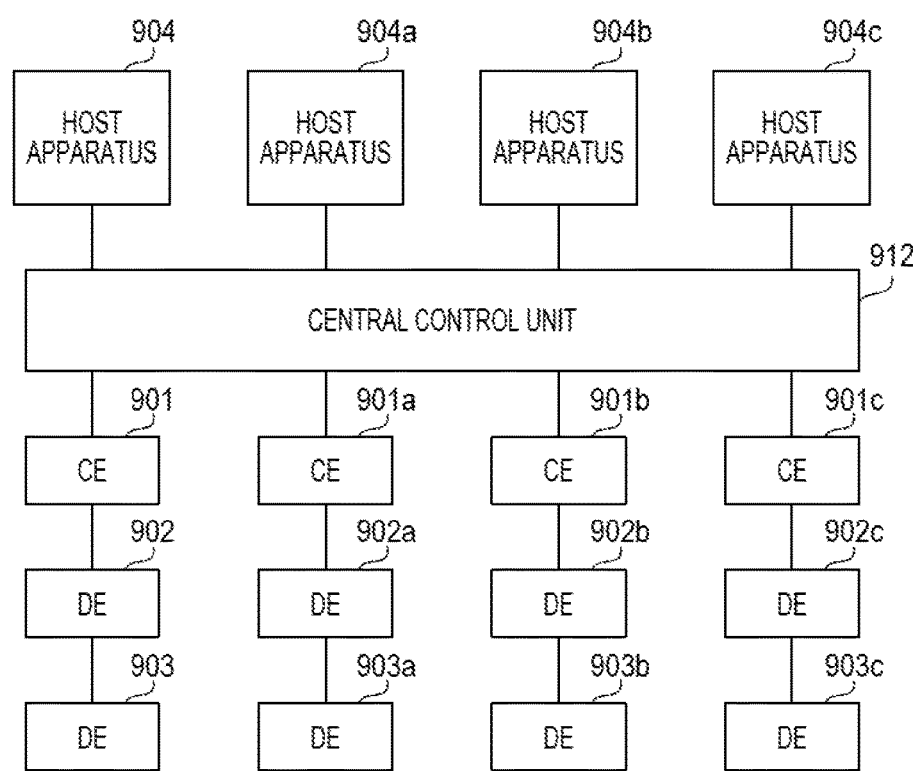
FIG. 26 is a diagram illustrating a second example for comparison.

Finally, FIGS. 25 and 26 illustrate examples for comparison regarding a storage system in which multiple storage apparatuses are coupled, and the superiority of the storage system of the second embodiment over these examples for comparison will be described.

FIG. 25 is a diagram illustrating a first example for comparison. A storage system illustrated in FIG. 25 includes a storage apparatus including a CE 901 and DEs 902, 903, a storage apparatus including a CE 901*a* and DEs 902*a*, 903*a*, a storage apparatus including a CE 901*b* and DEs 902*b*, 903*b*, and a storage apparatus including a CE 901*c* and DEs 902*c*, 903*c*. A host apparatus 904 is coupled with the CE 901, a host apparatus 904*a* is coupled with the CE 901*a*, a host apparatus 904*b* is coupled with the CE 901*b*, and a host apparatus 904*c* is coupled with the CE 901*c*.

In order to allow each CE to access all HDDs in any CE in the storage system by coupling such storage apparatuses, a method may be adopted in which the CEs 901, 901*a*, 901*b*, 901*c* are coupled via a dedicated relay apparatus 911 as illustrated in FIG. 25.

With this method, communication traffic between CEs is concentrated on the relay apparatus 911, and thus the communication load of the relay apparatus 911 increases as a storage apparatus is additionally installed and the system size is increased. Therefore, in order to construct a large-scale system, an expensive relay apparatus 911 having high communication processing performance has to be used. In addition, the number of additionally installable storage apparatuses is limited by the number of ports mounted in the relay apparatus 911.

On the other hand, in the storage system according to the second embodiment, a local transmission path for accessing an HDD from the CE of a storage apparatus is coupled with the CE of the subsequent storage apparatus, and thus the storage apparatuses are coupled in a loop. According to this configuration, data transmitted between CEs is distributed within the storage system, and communication traffic is not likely to be concentrated on a specific portion in the system. Consequently, it is possible to construct a large-scale storage system having high performance with a low cost without using an expensive relay apparatus 911 with enhanced performance.

Also, by using the simple topology described above, the number of storage apparatuses may be increased and a maximum number of installable storage apparatuses may be increased independently of the number of ports of the relay apparatus 911. In addition, according to the second embodiment, a SAS protocol is terminated for each local transmission path corresponding to each storage apparatus, and independent communication is performed by using respective SAS protocols. Therefore, no matter how many times a storage apparatus is additionally installed, nearly maximum number of HDDs allowable by the SAS protocol may be mounted in each storage apparatus. In other words, not only the number of storage apparatuses additionally installable in the storage system may be increased, but also the number of HDDs additionally installable in the entire storage system may be increased.

Next, as another method of coupling between the storage apparatuses, a method may be adopted in which CEs are coupled with each other over a network instead of via the relay apparatus 911 of FIG. 25. However, even with this method, the network communication traffic increases as a storage apparatus is additionally installed and the system size is increased. Thus, in order to construct a large-scale system, a network having a wide communication bandwidth has to be used and the cost increases.

In contrast to this, as described above, with the storage system according to the second embodiment, it is possible to construct a large-scale storage system having high performance with a low cost.

FIG. 26 is a diagram illustrating a second example for comparison. It is to be noted that in FIG. 26, the components corresponding to those in FIG. 25 are labeled with the same symbols.

In the example of FIG. 26, the CEs 901, 901*a*, 901*b*, 901*c* and the host apparatuses 904, 904*a*, 904*b*, 904*c* are coupled via a central control unit 912. In this example, the central control unit 912 manages, as virtual storage areas, the respective storage areas of the DEs 902, 903, 902*a*, 903*a*, 902*b*, 903*b*, 902*c*, 903*c* coupled with and subordinated to the central control unit 912. The central control unit 912 receives an access request to a virtual storage area from the host apparatuses 904, 904*a*, 904*b*, 904*c*, and distributes the access request to a corresponding HDD.

When such a centralized central control unit 912 is used, the processing load of the central control unit 912 increases as a storage apparatus is additionally installed and the system size is increased. Therefore, in order to construct a large-scale system, an expensive central control unit 912 having high processing performance has to be used.

With the storage system according to the second embodiment, it is possible to construct a large-scale storage system having high performance with a low cost without using such an expensive central control unit 912 with enhanced performance.

In each of the methods of FIGS. 25 and 26, there is a problem in that if a failure occurs in the relay apparatus 911 or the central control unit 912, access to an HDD is stopped. The storage system of the second embodiment allows bidirectional communication in the loop-form transmission path. Thus, even when a failure occurs in one of a CE, a DE, a storage apparatus, the operation may be continued using the remaining storage apparatuses excluding a storage apparatus including a failed device.

In the second embodiment described above, the example has been described in which the SAS interface is used as an interface for communication between a CE and a DE, and between a CE and an adjacent CE. However, without being limited to this, an interface that supports at least multi-initiator may be used. Also, by using an interface which allows a hot swap, it is possible to additionally install a storage apparatus or a DE and to replace a failed device while continuing the operation of the system. The interfaces that satisfy such conditions include FC, for instance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage system, comprising:
   storage apparatuses each including:
   a control device, and
   memory devices coupled in series with the control device through a first transmission path having the control device at a beginning, the memory devices being accessed by the control device; and
   a second transmission path coupling the storage apparatuses in a loop for communications between the control devices of the storage apparatuses, the second transmission path including the first transmission paths included in the respective storage apparatuses, the second transmission path being formed such that an ending of the first transmission path included in a first storage apparatus of the storage apparatuses is coupled to the beginning of the first transmission path included in a second storage apparatus of the storage apparatuses, subsequent to the first storage apparatus on the second transmission path.

2. The storage system according to claim 1, wherein
each of the control devices includes a first interface and a second interface different from the first interface, and
the second transmission path is formed such that the beginning of the first transmission path included in the first storage apparatus is connected to the first interface included in the first storage apparatus and the ending of the first transmission path included in the first storage apparatus is connected to the second interface included in the second storage apparatus.

3. The storage system according to claim 2, wherein
the control device included in the first storage apparatus includes a processor configured to
receive second command information via the second interface, the second command information including position information and first command information, the position information indicating a position of a target memory device to be accessed, the first command information indicating an operation to be executed by the target memory device,
determine, on basis of the position information, whether the target memory device is one of the memory devices included in the first storage apparatus,
transmit the first command information to the target memory device via the first interface when the target memory device is one of the memory devices included in the first storage apparatus, the first command information being extracted from the second command information, and
transfer the second command information via the first interface to the second interface included in the second storage apparatus when the target memory device is not any of the memory devices included in the first storage apparatus.

4. The storage system according to claim 3, wherein
the first interface included in the first storage apparatus operates as a SAS initiator on the first transmission path included in the first storage apparatus, and
the memory devices coupled with the first transmission path and the second interface included in the second storage apparatus each operate as a SAS target on the first transmission path.

5. The storage system according to claim 1, wherein
a first control device included in the first storage apparatus includes a first processor configured to
transmit, when accessing a first memory device of the memory devices included in a third storage apparatus of the storage apparatuses, an access request for accessing the first memory device to a second control device included in the third storage apparatus through the second transmission path, and
the second control device includes a second processor configured to
access the first memory device in response to the access request.

6. The storage system according to claim 5, wherein
the first processor is configured to
transmit, as the access request, second command information when accessing the first memory device, the second command information including position information and first command information, the position information indicating a position of the first memory device, the first command information indicating an operation to be executed by the first memory device, and
the second processor is configured to
access the first memory device on basis of the first command information upon receiving the second command information.

7. The storage system according to claim 6, wherein
the second processor is configured to
determine, upon receiving the second command information, that the first memory device indicated by the position information is one of the memory devices included in the third storage apparatus, and
access the first memory device indicated by the position information on basis of the first command information.

8. The storage system according to claim 6, wherein
a fourth storage apparatus is present on the second transmission path between the first storage apparatus and the third storage apparatus, and
a third control device included in the fourth storage apparatus includes a third processor configured to
determine, upon receiving the second command information through the second transmission path, that the first memory device indicated by the position information is not included in the fourth storage apparatus, and
transfer the second command information to a fourth control device of a fifth storage apparatus subsequent to the fourth storage apparatus on the second transmission path.

9. The storage system according to claim 6, wherein
the first processor is configured to
determine a direction in which the second command information is to be transmitted on the second transmission path, on basis of a number of other control devices present in respective directions between the first control device and the second control device on the second transmission path, and
transmit the second command information in the determined direction.

10. A storage apparatus, comprising:
a control device;
a transmission path having the control device at a beginning; and
memory devices coupled in series with the control device through the transmission path, the memory devices being accessed by the control device,
wherein the control device includes a processor configured to
transmit first command information to a first memory device of the memory devices when accessing the first memory device, the first command information indicating an operation to be executed by the first memory device, and
transmit third command information to a subsequent storage apparatus when accessing a second memory device other than the memory devices, the subsequent storage apparatus being connected to an ending of the transmission path, the third command information including first position information and second command information, the first position information indicating a position of the second memory device, the second command information indicating an operation to be executed by the second memory device.

11. The storage apparatus according to claim 10, wherein the processor is configured to generate the third command information when accessing the second memory device in response to a request from a host apparatus coupled with the control device, and transmit the generated third command information to the transmission path.

12. The storage apparatus according to claim 10, wherein the control device further includes a first interface connected to the beginning of the transmission path, and a second interface coupled with a preceding storage apparatus, and the processor is configured to receive fifth command information from the preceding storage apparatus via the second interface, the fifth command information including second position information and fourth command information, the second position information indicating a position of a target memory device to be accessed, the fourth command information indicating an operation to be executed by the target memory device, determine, on basis of the second position information, whether the target memory device is one of the memory devices, transmit, when the target memory device is one of the memory devices, the fourth command information extracted from the fifth command information to the target memory device via the first interface, and transfer, when the target memory device is not any of the memory devices, the fifth command information via the first interface to the subsequent storage apparatus.

13. A communication method, comprising:

transmitting, by a control device, first command information to a first transmission path when accessing a first memory device included in a first storage apparatus including the control device, the first command information indicating an operation to be executed by the first memory device, the first transmission path having the control device at a beginning and coupling memory devices in series, the first memory device being one of the memory devices; and transmitting third command information to a second transmission path when accessing a second memory device included in a second storage apparatus different from the first storage apparatus, the third command information including position information and second command information, the position information indicating a position of the second memory device, the second command information indicating an operation to be executed by the second memory device, the second transmission path including the first transmission path and coupling storage apparatuses in a loop, the storage apparatuses including the first storage apparatus and the second storage apparatus, the first transmission path being connected at an ending to a storage apparatus subsequent to the first storage apparatus.

* * * * *